United States Patent
Sakura

(10) Patent No.: US 8,854,670 B2
(45) Date of Patent: Oct. 7, 2014

(54) PRINTING SYSTEM AND PRINT CONTROL METHOD

(75) Inventor: Masayuki Sakura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 245 days.

(21) Appl. No.: 13/565,640

(22) Filed: Aug. 2, 2012

(65) Prior Publication Data

US 2013/0033726 A1    Feb. 7, 2013

(30) Foreign Application Priority Data

Aug. 5, 2011  (JP) .................................. 2011-172182

(51) Int. Cl.
*G06F 3/12* (2006.01)
*G06K 15/00* (2006.01)

(52) U.S. Cl.
CPC ............ *G06F 3/1204* (2013.01); *G06F 3/1288* (2013.01); *G06F 3/1261* (2013.01)
USPC .......................... 358/1.15; 358/1.13; 358/1.14

(58) Field of Classification Search
CPC .............................. G06F 3/1261; G06F 3/1269
See application file for complete search history.

(56) References Cited

U.S. PATENT DOCUMENTS 7,256,909 B2 *   8/2007  Gomi ............................ 358/1.18
2005/0141014 A1 *   6/2005  Kikuchi et al. ............... 358/1.14

FOREIGN PATENT DOCUMENTS

JP       2006-347110 A     12/2006

* cited by examiner

*Primary Examiner* — Dov Popovici
(74) *Attorney, Agent, or Firm* — Canon U.S.A., Inc., IP Division

(57) ABSTRACT

A client apparatus, after inputting a print job to a print service server apparatus, delivers a multicast message including information relating to an execution apparatus that executes the print job and information relating to a proxy apparatus managed by the print service server apparatus that manages the execution apparatus. When an image output apparatus receives the message, the image output apparatus determines whether the apparatus itself executes the print job or requests the proxy apparatus to execute the print job for the apparatus itself, based on a content of the message. If the image output apparatus determines to request the proxy apparatus to execute the print job for the apparatus itself, the image output apparatus requests the proxy apparatus to execute the print job.

10 Claims, 18 Drawing Sheets

FIG.16A

PRINT SERVICE ID INPUT — 501 ✕

INPUT FOLLOWING INFORMATION TO REGISTER PRINTER.

ID: [ user1 ] — 502
PASSWORD: [ ******** ] — 503

PRINTER SELECTION — 511 ✕

SELECT PRINTER FOR WHICH TO GENERATE PRINT QUEUE.

512 — [ PRINTER A ▼ ]

PROXY PRINTER SELECTION — 601 ✕

602 — ☑ DESIGNATE PROXY PRINT PRINTER
603 — [ PRINTER B ▼ ]

605 — [ CANCEL ]   [ OK ] — 604

FIG.17A

| | | |
|---|---|---|
| 701 Message: | "Sent Print Job" | ~700 |
| 702 JobID: | 6bdd1fc6-810f-11d0-bec7-08002be2092f | |
| 703 DestinationPrinterID: | c4aa5f44-4ae5-48e5-8f2a-7ddf46d30c49 | |
| 704 ProxyPrinterID: | 1781e8c1-e341-43a5-94ad-b47856b748be | |
| 705 DestinationPrinterPPM: | 60 | |
| 706 ProxyPrinterPPM: | 30 | |
| 707 JobAmount: | 35 | |
| 708 PrintServiceURL: | "http://pservice.abc.jp/ipp/" | |

FIG.17B

| | | |
|---|---|---|
| 721 Message: | "Destination Printer Pulled Print Job" | ~720 |
| 722 JobID: | 6bdd1fc6-810f-11d0-bec7-08002be2092f | |
| 723 DestinationPrinterID: | c4aa5f44-4ae5-48e5-8f2a-7ddf46d30c49 | |
| 724 ProxyPrinterID: | 1781e8c1-e341-43a5-94ad-b47856b748be | |
| 725 PrintServiceURL: | "http://pservice.abc.jp/ipp/" | |

FIG.17C

| | | |
|---|---|---|
| 741 Message: | "Destination Printer Cannot Pull Print Job" | ~740 |
| 742 JobID: | 6bdd1fc6-810f-11d0-bec7-08002be2092f | |
| 743 DestinationPrinterID: | c4aa5f44-4ae5-48e5-8f2a-7ddf46d30c49 | |
| 744 ProxyPrinterID: | 1781e8c1-e341-43a5-94ad-b47856b748be | |
| 745 PrintServiceURL: | "http://pservice.abc.jp/ipp/" | |

FIG.17D

| | | |
|---|---|---|
| 761 Message: | "Request Status" | ~760 |
| 762 DestinationPrinterID: | c4aa5f44-4ae5-48e5-8f2a-7ddf46d30c49 | |
| 763 ProxyPrinterID: | 1781e8c1-e341-43a5-94ad-b47856b748be | |

FIG.17E

| | | |
|---|---|---|
| 781 Message: | "Reply Status" | ~780 |
| 782 DestinationPrinterID: | c4aa5f44-4ae5-48e5-8f2a-7ddf46d30c49 | |
| 783 ProxyPrinterID: | 1781e8c1-e341-43a5-94ad-b47856b748be | |
| 784 Status: | "Ready to Print" | |

PRINTING SYSTEM AND PRINT CONTROL METHOD

BACKGROUND OF THE INVENTION

1. Field of the Invention

The present invention relates to a printing system and a print control method.

2. Description of the Related Art

In a conventionally proposed printing system, a client apparatus directly outputs a print job to a printer (i.e., an image output apparatus) connected to a local area network. In the above-described conventional printing system, the client apparatus outputs the print job to the printer via a printer driver installed on the client apparatus.

In another conventionally proposed printing system, a client apparatus instructs an image output apparatus to perform print processing via a print service server apparatus connected to the Internet. In the above-described conventional printing system, the print service server apparatus can provide a print-related function. More specifically, the print service server apparatus receives a print job transmitted from the client apparatus and performs bookbinding imposition printing or copy-forgery-inhibited pattern printing, or provides a personal box function, according to the received print job.

According to the above-described conventional printing system in which the client apparatus directly outputs a print job to the printer, a specific function may not be realized if the printer driver installed on the client apparatus is insufficient in capability. For example, when a printer driver of an operating system has the capability of performing bookbinding printing, a printer driver of another operating system may not be able to perform the bookbinding printing.

Further, the realization of a specific function is dependent on the capability of each printer. For example, a printer may not be able to perform the copy-forgery-inhibited pattern printing or may not be able to provide the personal box function.

In this case, if the print service server apparatus in the printing system can provide a function that cannot be provided by the printer driver/printer, the user can use the same printing function constantly regardless of differences in ability or function of the printer driver/printer.

According to the above-described printing system, for example, the printer is connected to the print service server apparatus via a gateway apparatus. In this case, the print service server apparatus cannot directly transmit a print job to the printer. Accordingly, for example, the printer checks about, by polling, the presence of a print job addressed to the apparatus itself that is existing in the print service server apparatus and acquires the job addressed to the apparatus itself.

As discussed in Japanese Patent Application Laid-Open No. 2006-347110, it is conventionally known that an image output apparatus can deliver a multicast message including print attribute information via a network, if the image output apparatus is not ready to print, and can request another image output apparatus in a ready-to-print state to perform proxy printing.

If the polling interval of the printer is set to a significantly long time to eliminate network traffic congestion, the printer may not be able to output a print product promptly in response to a print instruction input by a user via the client apparatus. Hence, it is desired that the printing system can reduce the time lag between the print instruction by the user and the output of the print product, in the following manner.

First, after the client apparatus included in the printing system transmits a print job to the print service server apparatus, the client apparatus delivers a multicast message informing that the printer driver included in the client apparatus has transmitted the print job via a local area network. The printer can detect the transmitted print job upon receiving the multicast message, and can acquire the print job from the print service server apparatus. Thus, it becomes feasible to reduce the time lag between the print instruction by the user and the output of the print product.

However, even in a case where the printer driver notifies the printer of the timing of print job acquisition through multicast, the printer may not be able to perform printing for some reason. For example, the printer cannot perform printing due to lack of paper or lack of toner, or cannot perform printing when the printer performs calibration to adjust the image quality. Moreover, the printer cannot perform printing if the printer is in a power-OFF state, for example, when a failure occurs. In such cases, if a user inputs a print instruction while designating the printer, the user will not notice the above-described unprintable situation until the user comes to the printer setup place to pick up a printed product.

Further, according to the technique discussed in Japanese Patent Application Laid-Open No. 2006-347110, the following problem may arise when the multicast message including the print information is delivered in a case where the output destination printer is not ready to print and the proxy printing is performed by another printer that is ready to print. First, according to the technique discussed in Japanese Patent Application Laid-Open No. 2006-347110, the user is not noticed about the printer that outputs a printed product. Therefore, if the output destination printer did not perform printing, the user is required to check if there is any other printer that has output the print product.

Further, in general, in a case where a printing system performs printing via a print service server apparatus, it is necessary to register an output destination printer (i.e., an image output apparatus) with the print service server apparatus beforehand. Therefore, even when the image output apparatus delivers a multicast message including print information and requests another image output apparatus that is ready to print (i.e., a proxy apparatus) to perform proxy printing, the proxy apparatus cannot perform printing if the proxy apparatus is not registered with the print service server apparatus.

SUMMARY OF THE INVENTION

An aspect of the present invention is directed to a system that performs print processing via a server apparatus that manages an image output apparatus. When a print processing execution apparatus cannot perform the print processing, the printing system causes a proxy apparatus managed by the server apparatus to perform print processing on behalf of the execution apparatus.

According to an aspect of the present invention, a printing system includes at least one image output apparatus, a server apparatus that manages each of the at least one image output apparatus as a print job transmission destination, and an information processing apparatus that inputs a print job to the server apparatus and instructs the at least one image output apparatus to receive the print job from the server apparatus and to perform print processing based on the received print job. The information processing apparatus includes a job input unit configured to input the print job to the server apparatus, a selection unit configured to select an execution apparatus that operates as an image output apparatus that performs print processing and a proxy apparatus that operates as an image output apparatus that performs print processing on behalf of the execution apparatus, in which the proxy apparatus is managed by the server apparatus that manages the execution apparatus, and a multicast unit configured to deliver a multicast message relating to print instruction information, which is information instructing execution of the print processing and includes information relating to at least the selected execution apparatus and the proxy apparatus. The image output apparatus includes an instruction reception unit configured to receive the print instruction information, a first determination unit configured to determine whether the at least one image output apparatus is the execution apparatus or the proxy apparatus based on information relating to the execution apparatus and the proxy apparatus included in the received print instruction information, and an acquisition unit configured to acquire state information of the proxy apparatus based on information relating to the proxy apparatus included in the print instruction information if the first determination unit determines that the at least one image output apparatus is the execution apparatus. The image output apparatus further includes a second determination unit configured to determine whether the at least one image output apparatus operates as the execution apparatus that performs print processing instructed by the print instruction information or requests the proxy apparatus to perform proxy print processing, based on state information of the at least one image output apparatus and the acquired state information of the proxy apparatus, and a proxy request unit configured to deliver a multicast message requesting the proxy apparatus to perform proxy print processing if the second determination unit determines that the at least one image output apparatus requests the proxy apparatus to perform proxy print processing. The at least one image output apparatus further includes a job execution unit configured to acquire a print job that corresponds to the print processing from the server apparatus and to execute the acquired print job if the second determination unit determines that the at least one image output apparatus operates as the execution apparatus that performs print processing, and a message reception unit configured to monitor and receive the multicast message if the first determination unit determines that the at least one image output apparatus is the proxy apparatus. The job execution unit is configured to acquire the print job that corresponds to the print processing from the server apparatus and to execute the acquired print job if the first determination unit determines that the at least one image output apparatus is the proxy apparatus and the message reception unit receives the message requesting the proxy apparatus to perform proxy print processing.

According to an exemplary embodiment of the printing system, when print processing is performed via the server apparatus that manages an image output apparatus, if the print processing execution apparatus cannot perform the print processing, the system causes the proxy apparatus managed by the server apparatus that manages the execution apparatus to perform the print processing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 16A, 16B, and 16C illustrate examples of a print service ID input dialog, an image output apparatus list dialog, and a proxy printer selection dialog.

FIGS. 17A, 17B, 17C, 17D, and 17E illustrate example messages that can be transmitted via a network.

DESCRIPTION OF THE EMBODIMENTS

Various exemplary embodiments, features, and aspects of the invention will be described in detail below with reference to the drawings.

Figure 1:
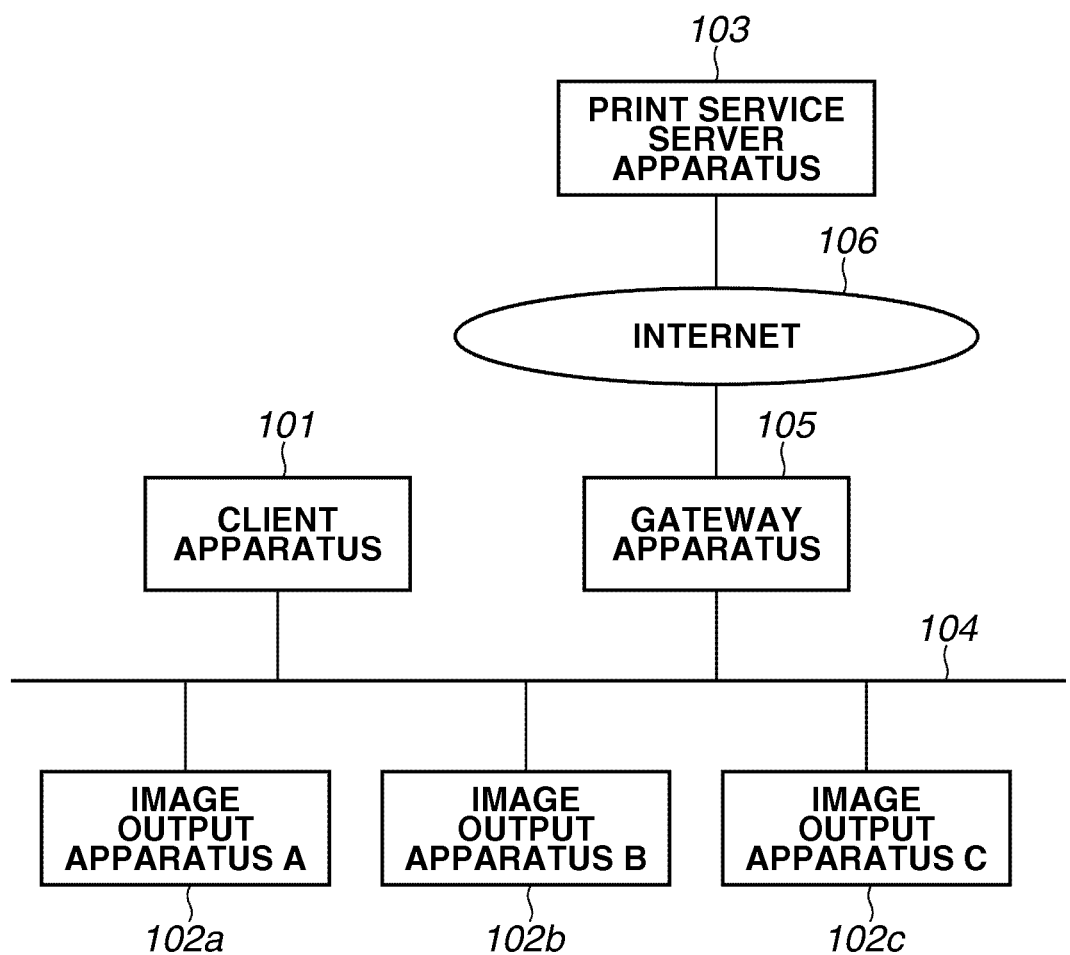
FIG. 1 illustrates an example configuration of a printing system according to a first exemplary embodiment of the present invention.

FIG. 1 illustrates an example configuration of a printing system according to a first exemplary embodiment of the present invention. The printing system illustrated in FIG. 1 includes an image output apparatus A (102*a*), an image output apparatus B (102*b*), an image output apparatus C (102*c*), a client apparatus 101, and a print service server apparatus 103. In the following description, each of three image output apparatuses may be referred to as an "image output apparatus 102."

The client apparatus 101 and the image output apparatus 102 are accessible to each other via a network 104. The network 104 is, for example, the Ethernet. Further, the print service server apparatus 103 is connected to the Internet 106.

The client apparatus 101 is an information processing apparatus that can be operated by a user. The client apparatus 101 inputs a print job to the print service server apparatus 103 via the Internet 106. After inputting the print job to the print service server apparatus 103, the client apparatus 101 performs print job transmission multicast processing.

The print job transmission multicast processing is delivering a multicast message informing that the client apparatus 101 has transmitted (input) the print job via the network 104. The print job transmission multicast includes information relating to the print job. The information relating to the print job includes at least information relating to an output destination image output apparatus and information relating to a proxy image output apparatus. The output destination image output apparatus is an image output apparatus that can perform print processing. More specifically, the output destination image output apparatus is an image output apparatus (i.e., an execution apparatus) designated by a user of the client apparatus 101 to perform print processing. The proxy image output apparatus is an image output apparatus (i.e., a proxy apparatus) that performs print processing for the output destination image output apparatus. The proxy image output apparatus is one of the image output apparatuses managed by the print service server apparatus 103 (i.e., the apparatus that manages the output destination image output apparatus).

When the image output apparatus 102 receives a print job transmission multicast message, the image output apparatus 102 determines whether the apparatus itself performs print processing based on print job related information included in the print job transmission multicast message. If the image output apparatus 102 determines that the apparatus itself performs print processing, the image output apparatus 102 transmits a print job acquisition request to the print service server apparatus 103 via the Internet 106. The print job acquisition request is a request that requires transmission of a print job. Then, the image output apparatus 102 receives a print job that corresponds to the print job acquisition request from the print service server apparatus 103 and executes the received print job. More specifically, through the process of sending the print job transmission multicast message, the client apparatus 101 instructs the image output apparatus 102 to receive a print job from the print service server apparatus 103 and perform print processing.

The print service server apparatus 103 is a server apparatus that can manage the image output apparatus 102 as a transmission destination of the print job. The print service server apparatus 103 can receive a print job input from the client apparatus 101 via the Internet 106. The print service server apparatus 103 can convert a print job received from the client apparatus 101 into a print job having a predetermined format and stores the converted print job. The print service server apparatus 103 can receive a print job acquisition request from the image output apparatus 102. Then, the print service server apparatus 103 can input a print job to the image output apparatus 102 according to the received print job acquisition request.

The printing system illustrated in FIG. 1 includes a gateway apparatus 105 provided between the Internet 106 and the network 104. Accordingly, the print service server apparatus 103 cannot autonomously access each of the client apparatus 101 and the image output apparatus 102 connected to the network 104. For example, the print service server apparatus 103 receives a print job acquisition request from the image output apparatus 102 and returns a print job as a response to the request. Each apparatus included in the printing system illustrated in FIG. 1 is functionally operable to realize a print control method according to the present exemplary embodiment.

Figure 2:
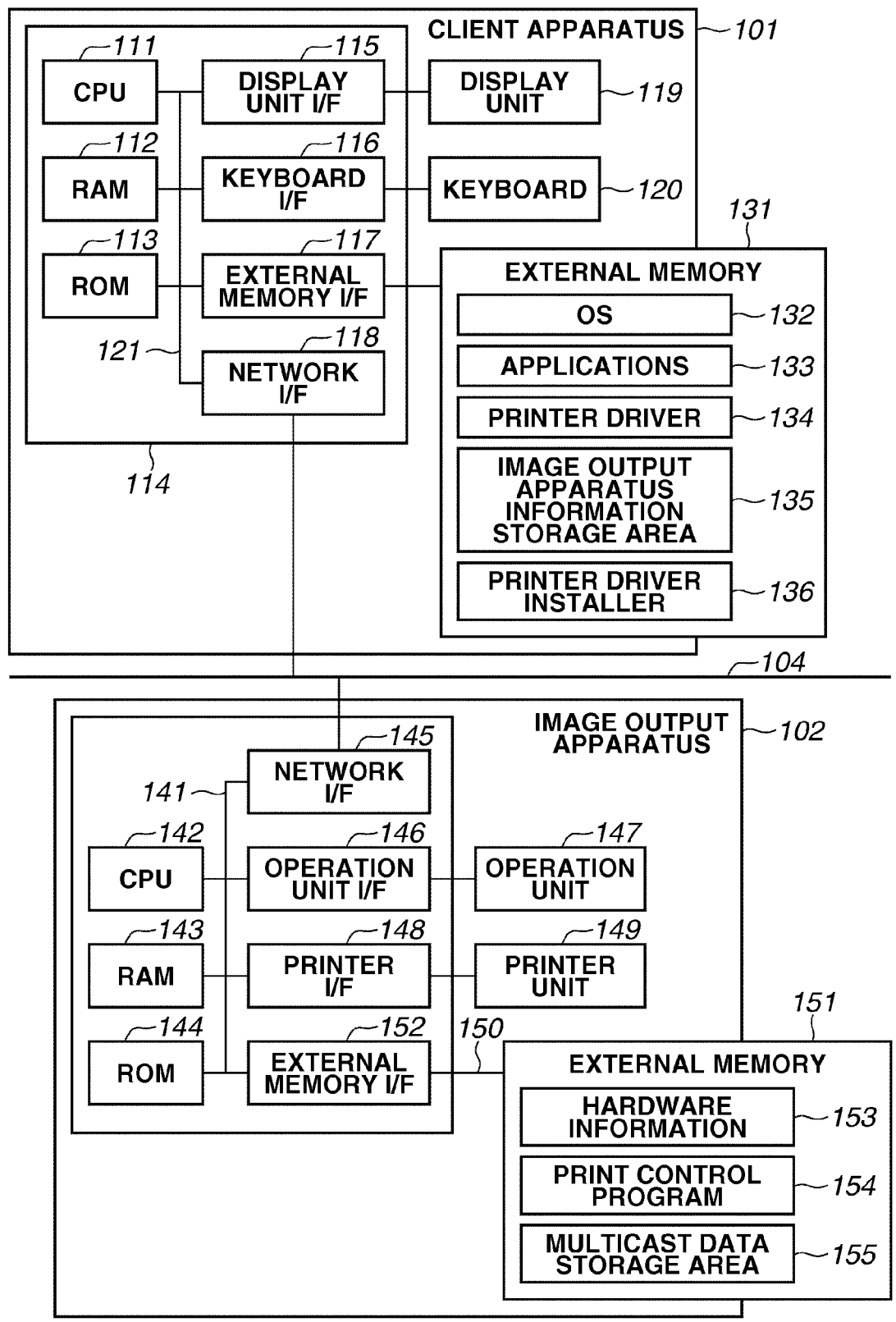
FIG. 2 illustrates an example configuration of a client apparatus and an image output apparatus according to the first exemplary embodiment of the present invention.

FIG. 2 illustrates an example configuration of the client apparatus 101 and the image output apparatus 102 illustrated in FIG. 1. The client apparatus 101 includes a central processing unit (CPU) 111, a random access memory (RAM) 112, a read only memory (ROM) 113, a display unit interface (I/F) 115, a keyboard I/F 116, and an external memory I/F 117. Further, the client apparatus 101 includes a network I/F 118, a display unit 119, a keyboard 120, and an external memory 131.

The CPU 111 can comprehensively control various devices connected to a system bus 121 according to a control program stored in the RAM 112. The RAM 112 is functionally operable as a main memory or a work area for the CPU 111.

The ROM 113 stores various programs and data. The display unit I/F 115 can control display processing to be performed by the display unit 119. The keyboard I/F 116 can control an input signal received via the keyboard 120 or a pointing device (not illustrated), such as a touch panel.

The external memory I/F 117 can control an access to the external memory 131, e.g., a flash memory, or a solid-state disk (SSD). The external memory 131 is functionally operable as a storage medium to which the client apparatus 101 can store data or from which the client apparatus 101 can read data. More specifically, the external memory 131 stores an operating system (OS) 132, applications 133, a printer driver 134, an image output apparatus information storage area 135, and a printer driver installer 136. For example, a browser application is included in the applications 133.

The printer driver 134 can manage an output destination (e.g., the image output apparatus 102 or the print service server apparatus 103) of the information relating to a print instruction received from the client apparatus 101. The image output apparatus information storage area 135 stores image output apparatus information. The image output apparatus information is information relating to the image output apparatus 102. The image output apparatus information includes, at least, image output apparatus ID, image output apparatus name, and print processing speed. The image output apparatus ID is identification information that can uniquely identify the image output apparatus 102. The image output apparatus name is the name of the image output apparatus 102. The print processing speed is the speed of print processing performed by the image output apparatus 102. The printer driver installer 136 can install the printer driver 134 on the client apparatus 101.

The network I/F 118 is a network control unit. More specifically, the network I/F 118 can connect the client apparatus 101 to the network 104 via a network terminal.

The image output apparatus 102 includes a CPU 142, a RAM 143, a ROM 144, a network I/F 145, an operation unit I/F 146, a printer I/F 148, an external memory I/F 152, an operation unit 147, a printer unit 149, and an external memory 151.

The CPU 142 can control various operations to be performed by the image output apparatus 102. More specifically, the CPU 242 can integrally control various devices connected to a system bus 141. The RAM 143 is functionally operable as a main memory or a work area for the CPU 142. Further, the RAM 143 can be used as an image information rasterizing area or an environmental data storage area. Further, the RAM 143 includes a nonvolatile random access memory (NVRAM) area. The RAM 143 has an additional port (not illustrated) to which an optional RAM can be connected to extend the entire memory capacity.

The CPU 142 can communicate with the client apparatus 101 via the network I/F 145. Further, the CPU 142 can send a notification including information relating to the image output apparatus 102 to the client apparatus 101 via the network 105. Further, the CPU 142 can send a print job acquisition request to the print service server apparatus 103 via the network I/F 145 and the Internet 106. Further, the CPU 142 can receive a print job from the print service server apparatus 103 via the network I/F 145 and the Internet 106.

In the present exemplary embodiment, the network I/F 145 can use packaged service protocols. Further, the network I/F 145 can use a plurality of types of packaged protocols as print job reception protocols. For example, the protocols usable by the network I/F 145 include Line Printer Daemon Protocol (LPR) and Port 9100, which enable reception of a print job via a local network. Further, for example, the protocols usable by the network I/F 145 include Internet Printing Protocol (IPP), which is suitable to receive a print job via the Internet.

Further, the CPU 142 can transmit image data to the printer unit 149, via the printer I/F 148, based on a control program stored in the ROM 144. The printer unit 149 performs print processing based on the received image data.

The ROM 144 stores various data, such as various fonts and control programs to be executed by the CPU 142. The network I/F 145 can communicate with the client apparatus 101 to perform data transmission/reception processing. The printer I/F 148 is an interface that can control the printer unit 149 (i.e., a printer engine).

The external memory I/F 152 can control an access to the external memory 151. For example, the external memory 151 includes a hard disk, a flash memory, or an SSD. The external memory 151 includes hardware information 153, a print control program 154, and a multicast data storage area 155. The hardware information 153 is information relating to the hardware included in the image output apparatus 102.

The print control program is a control program that controls operational processing to be performed by the image output apparatus 102. Information of a multicast message received by the image output apparatus 102 via the network 104 is stored in the multicast data storage area 155. When the external memory 151 is not connected to the image output apparatus 102, information that the client apparatus 101 uses can be stored in the ROM 144.

The operation unit I/F 146 is an interface capable of controlling the operation unit 147 that enables the users to set processing (e.g., scan processing) to be executed by the image output apparatus 102. The operation unit 147 includes an operation panel that can receive a user's operation. Various switches and a light emitting diode (LED) display device are provided on the operation panel. Print setting information input via the operation panel can be stored in the NVRAM (not illustrated).

Figure 3:
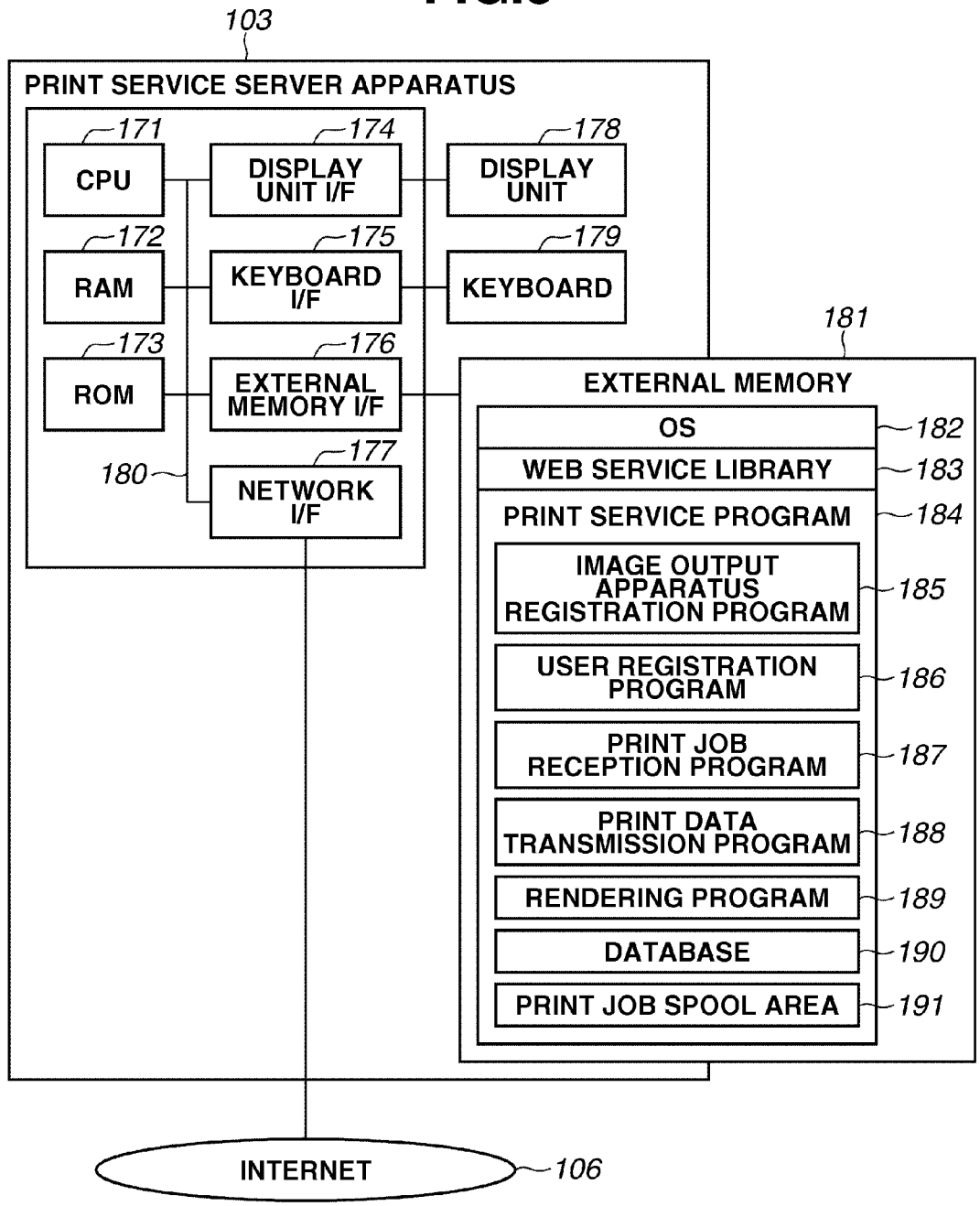
FIG. 3 illustrates an example configuration of a print service server apparatus according to the first exemplary embodiment of the present invention.

FIG. 3 illustrates an example configuration of the print service server apparatus 103. The print service server apparatus 103 includes a CPU 171, a RAM 172, a ROM 173, a display unit I/F 174, a keyboard I/F 175, and an external memory I/F 176. Further, the print service server apparatus 103 includes a network I/F 177, a display unit 178, a keyboard 179, and an external memory 181.

The CPU 171 can integrally control various devices connected to a system bus 180 according to a program stored in the RAM 172. The RAM 172 is functionally operable as a main memory or a work area for the CPU 171.

The ROM 173 stores various programs and data. The keyboard I/F 175 can control an input signal received via the keyboard 179 or a pointing device (not illustrated), such as a mouse. The display unit I/F 174 can control display processing to be performed by the display unit 178.

The external memory I/F 176 can control an access to the external memory 181, such as hard disk (HD) or an SSD. The external memory 181 stores an OS 182, a web service library 183, and a print service program 184.

The print service program 184 includes an image output apparatus registration program 185, a user registration program 186, a print job reception program 187, a print data transmission program 188, and a rendering program 189. Further, the print service program 184 includes a database 190 and a print job spool area 191.

The image output apparatus registration program 185 is a program capable of acquiring image output apparatus information from the image output apparatus 102 and registers the acquired information with the database 190. The user registration program 186 is a program capable of performing the user registration.

The print job reception program 187 is a program capable of receiving a print job from the client apparatus 101. The print data transmission program 188 is a program capable of transmitting print data (including a print job) to the image output apparatus 102 (i.e., a print job acquisition request source). The rendering program 189 is a program capable of performing rendering processing.

For example, the rendering program 189 performs rendering processing according to a print job received from the client apparatus 101 and generates print data to be transmitted to the image output apparatus 102. The database 190 stores the image output apparatus information. Further, the database 190 stores various programs, for example, for storing the user files and other setting files. The print job received from the client apparatus 101 is temporarily stored in the print job spool area 191.

The network I/F 177 is connected to the image output apparatus 102 via the Internet 106 and the network 104. Thus, the network I/F 177 can transfer data (e.g. can send a print job) to the image output apparatus 102.

Figure 4:
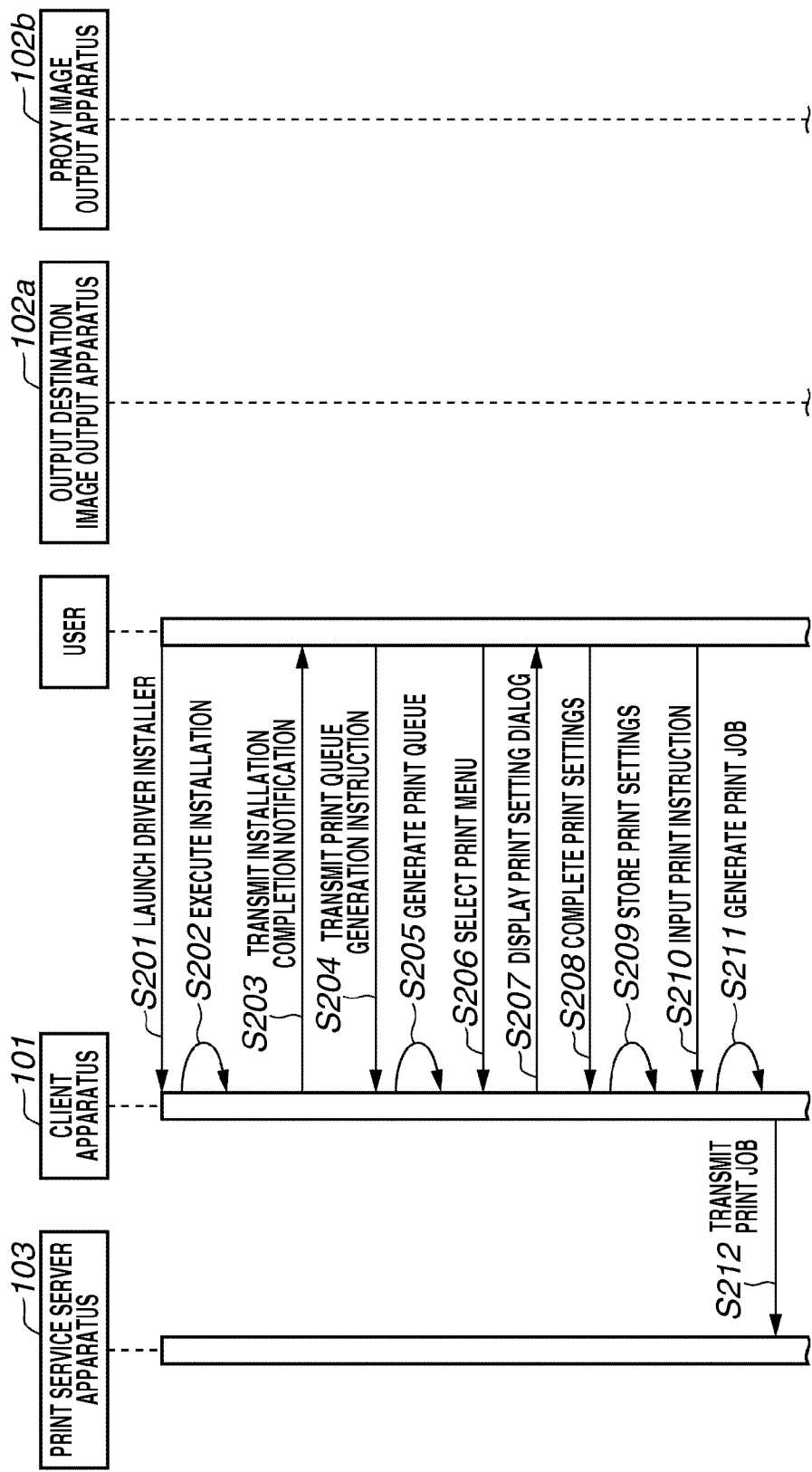
FIG. 4 is a sequence diagram (1) illustrating an example of operational processing that can be performed by the printing system according to the first exemplary embodiment of the present invention.
Figure 5:
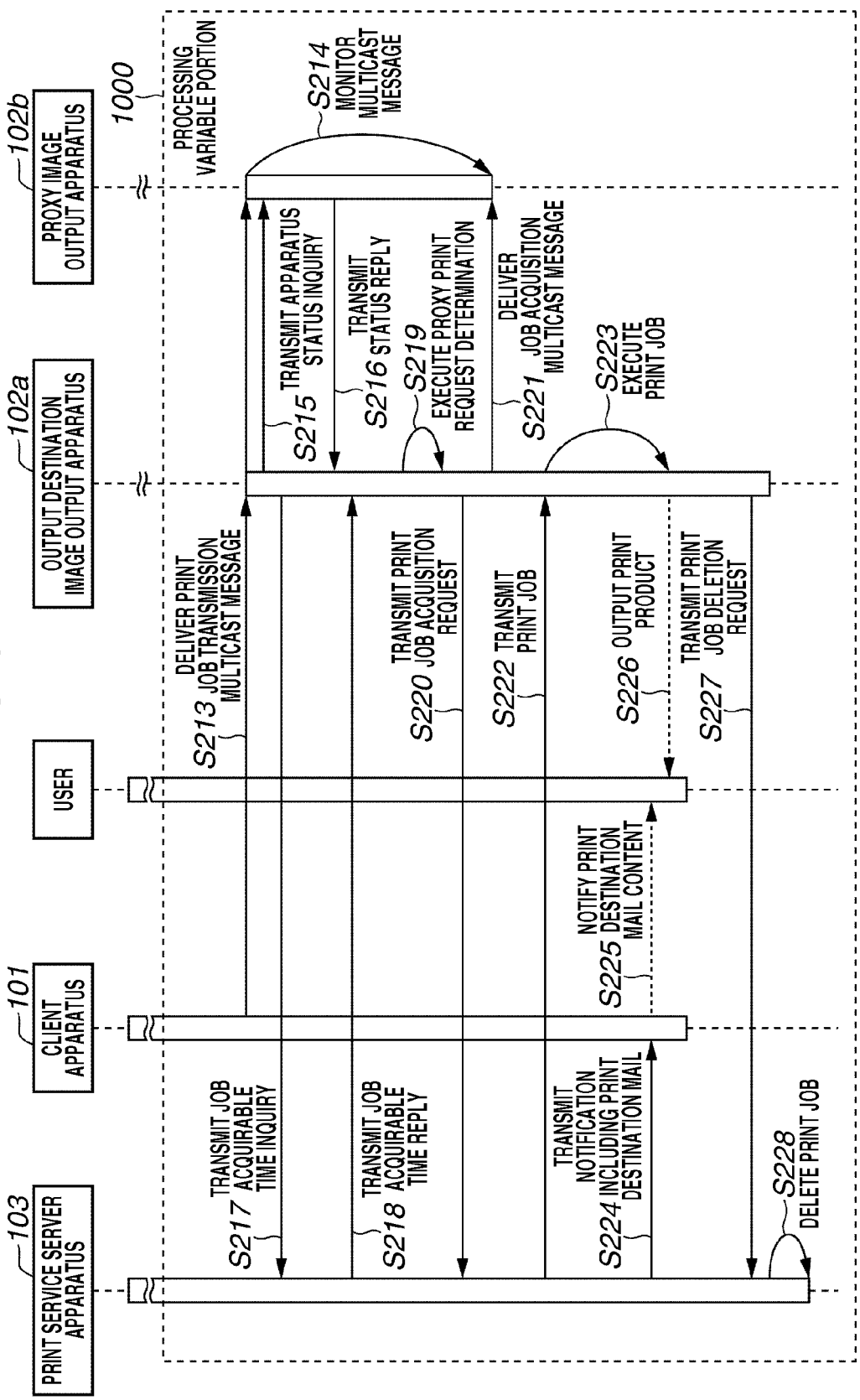
FIG. 5 is a sequence diagram (2) illustrating an example of operational processing that can be performed by the printing system according to the first exemplary embodiment of the present invention.

FIGS. 4 through 7 are sequence diagrams illustrating examples of the operational processing that can be performed by the printing system. It is now assumed that the client apparatus 101 is accessible to the image output apparatus 102 via the network 104. Further, the client apparatus 101 and the image output apparatus 102 are accessible to the print service server apparatus 103 via the gateway apparatus 105 and the Internet 106. In FIG. 5, a processing variable portion 1000 indicated by a dotted line is a portion where the processing contents are variable depending on processing conditions. For example, processing described with reference to FIG. 6 or processing described with reference to FIG. 7 can replace the processing variable portion 1000 depending on the processing conditions.

According to the operational processing examples illustrated in FIG. 4 and FIG. 5, the output destination image output apparatus 102a performs proxy print request determination and, as a result, determines that the apparatus itself performs print processing. The proxy print request determination performed by the output destination image output apparatus 102a is intended to determine whether the apparatus itself performs the print processing or requests the proxy image output apparatus 102b to perform proxy print processing.

In step S201 of the sequence diagram illustrated in FIG. 4, a user launches the printer driver installer 136 to install the printer driver 134 on the client apparatus 101. In step S202, the launched printer driver installer 136 installs the printer driver 134. Subsequently, in step S203, the printer driver installer 136 transmits a notification informing completion of the driver installation to the user.

Next, in step S204, the user transmits a print queue generation instruction. The print queue is a queue capable of storing a print job and outputting the stored print job. The print queue is generated for each image output apparatus that executes the print job. In step S205, the printer driver 134 included in the client apparatus 101 generates a print queue based on the print queue generation instruction.

Next, in step S206, the user opens a document and selects a print menu to print the document via the application 133. Subsequently, in step S207, the application 133 displays a print setting dialog.

The print setting dialog is a dialog that enables the user to set a print attribute. The user sets the output destination image output apparatus 102a and its print attribute on the print setting dialog, and sets the proxy image output apparatus 102b. Through the above-described setting operation, the CPU 111 is functionally operable as a selection unit configured to select the output destination image output apparatus 102a and the proxy image output apparatus 102b.

The selected proxy image output apparatus 102b is an image output apparatus that performs proxy print processing for the output destination image output apparatus 102a. The selected proxy image output apparatus 102b is one of the image output apparatuses managed by the print service server apparatus 103 that manages the output destination image output apparatus 102a.

Next, the user closes the print setting dialog to complete the print setting. Subsequently, in step S209, the OS 132 of the client apparatus 101 stores the set print attribute in a setting storage area of the OS 132. Subsequently, in step S210, the user inputs a print instruction to execute printing via the application 133.

In step S211, the printer driver 134 generates a print job according to the print instruction. Then, in step S212, the printer driver 134 transmits the generated print job, together with job ID, print attribute setting, output destination image output apparatus ID, and proxy image output destination ID, to the print service server apparatus 103 according to an instruction from the CPU 111. More specifically, the printer driver 134 is functionally operable as a job input unit configured to input a print job to the print service server apparatus 103.

The job ID is identification information that can uniquely identify each print job. The print attribute setting is a print attribute having been set. The output destination image output apparatus ID is identification information that can uniquely identify each output destination image output apparatus 102a. The proxy image output apparatus ID is identification information that can uniquely identify each proxy image output apparatus 102b.

Next, in step S213 illustrated in FIG. 5, the printer driver 134 of the client apparatus 101 delivers a print job transmission multicast message including print job related information via the network 104. The print job related information can function as print instruction information (i.e., information instructing execution of the print processing). More specifically, the print job related information includes job ID, output destination image output apparatus information, proxy image output destination information, print job amount (number of pages), and print service server apparatus address information.

The output destination image output apparatus information includes information relating to the print processing speed of the output destination image output apparatus, in addition to the above-described output destination image output apparatus ID. Proxy image output apparatus information includes information relating to the print processing speed of the proxy image output apparatus, in addition to the above-described proxy image output apparatus ID.

More specifically, the printer driver 134 is functionally operable as a multicast unit configured to deliver, via the network 104, multicast print instruction information that includes information instructing execution of the print processing, including at least the selected output destination image output apparatus 102a and the selected proxy image output apparatus 102b.

According to the illustrated example, the printer driver 134 is configured to deliver multicast print job related information. However, the printer driver 134 can be configured to transmit the print job related information via the network using a communication method other than the multicast, such as broadcast.

The image output apparatus 102 performs processing in step S214 and subsequent steps. First, each of the output destination image output apparatus 102a and the proxy image output apparatus 102b receives the print job transmission multicast message from the printer driver 134. More specifically, in each of the output destination image output apparatus 102a and the proxy image output apparatus 102b, the CPU is functionally operable as an instruction reception unit configured to receive print instruction information included in the print job transmission multicast message.

The output destination image output apparatus 102 determines whether the apparatus itself is currently selected as the output destination image output apparatus with reference to the print job transmission multicast message. If the output destination image output apparatus information included in the message designates the apparatus itself, the output destination image output apparatus 102a determines that the apparatus itself is currently selected as the output destination image output apparatus. According to the example illustrated in FIG. 5, the output destination image output apparatus 102a determines that the apparatus itself is currently selected as the output destination image output apparatus.

On the other hand, the proxy image output apparatus 102b determines whether the apparatus itself is currently selected as the proxy image output apparatus with reference to the print job transmission multicast message. If the proxy image output apparatus information included in the message designates the apparatus itself, the proxy image output apparatus 102b determines that the apparatus itself is currently selected as the proxy image output apparatus. According to the example illustrated in FIG. 5, the proxy image output apparatus 102b determines that the apparatus itself is currently selected as the output destination image output apparatus.

Then, in step S214, the proxy image output apparatus 102b monitors the multicast message transmitted from the output image output apparatus 102a for a predetermined duration. For example, the multicast message is a job acquisition multicast message or a proxy print request multicast message. As described below, the proxy image output apparatus 102b determines whether the monitoring duration has expired. If it is determined that the monitoring duration has expired, the proxy image output apparatus 102b stops monitoring the multicast message. According to the example illustrated in FIG. 5 (similar in FIG. 6), the proxy image output apparatus 102b determines the monitoring duration has not expired.

Next, in step S215, the output destination image output apparatus 102a transmits an apparatus status inquiry to the proxy image output apparatus 102b that corresponds to the proxy image output apparatus information, based on the proxy image output apparatus information included in the print job transmission multicast message. Subsequently, in step S216, the proxy image output apparatus 102b transmits a reply including information indicating the apparatus status of the apparatus itself to the output destination image output apparatus 102a.

Further, in step S217, the output destination image output apparatus 102a transmits a job acquirable time inquiry to the print service server apparatus 103. The job acquirable time inquiry includes the job ID of a job that corresponds to the job acquirable time. The print service server apparatus 103 identifies a target job based on the job ID included in the above-described inquiry.

The print service server apparatus 103 calculates the job acquirable time based on the processing content of the identified job and the status of the print job spool area 191 in the print service server apparatus 103. Then, in step S218, the print service server apparatus 103 transmits a reply including the calculated job acquirable time to the output destination image output apparatus 102a.

Next, in step S219, the output destination image output apparatus 102a executes the proxy print request determination. The proxy print request determination is the processing that determines whether the apparatus itself performs the print processing or requests the proxy image output apparatus 102b to perform proxy print processing.

The output destination image output apparatus 102a determines whether the apparatus itself performs the print processing based on information indicating the apparatus status received from the proxy image output apparatus 102b, the job acquirable time received from the print service server apparatus 103, and information indicating the status of the apparatus itself. According to the example illustrated in FIG. 4, the output destination image output apparatus 102a determines that the apparatus itself performs the print processing.

Next, in step S220, the output destination image output apparatus 102a transmits the print job acquisition request to the print service server apparatus 103. The print job acquisition request transmitted in step S220 includes the job ID of the target print job. Subsequently, in step S222, the print service server apparatus 103 transmits the print job that corresponds to the job ID included in the print job acquisition request to the output destination image output apparatus 102a.

In step S221, the output destination image output apparatus 102a delivers a job acquisition multicast message via the network 104 after transmitting the print job acquisition request to the print service server apparatus 103. The job acquisition multicast message includes information indicating that the apparatus itself has acquired (or acquires) the print job.

The proxy image output apparatus 102b receives the job acquisition multicast message. The proxy image output apparatus 102b recognizes that the output destination image output apparatus 102a has acquired the print job, based on the job acquisition multicast message. Then, the proxy image output apparatus 102b stops monitoring the multicast message. In step S223, the output destination image output apparatus 102a executes the print job received from the print service server apparatus 103 in step S222. Then, in step S226, the output destination image output apparatus 102a outputs a print product.

On the other hand, in step S224, the print service server apparatus 103 transmits a print destination mail to the client apparatus 101 after transmitting the print job to the output destination image output apparatus 102a in step S222. The print destination mail is an electronic mail notifying the image output apparatus that has acquired the print job. According to the illustrated example, the print destination mail sent from the print service server apparatus 103 to the client apparatus 101 indicates that the output destination image output apparatus 102a has acquired the print job.

In step S225, the client apparatus 101 notifies the user of the print destination mail content. Thus, the user can know (identify) the image output apparatus 102 that has actually performed the print processing. Subsequently, upon completing the print processing, namely in step S227, the output destination image output apparatus 102a transmits a print job deletion request to the print service server apparatus 103 while designating the job ID. In step S228, the print service server apparatus 103 deletes the print job that has the job ID designated in the print job deletion request.

Figure 6:
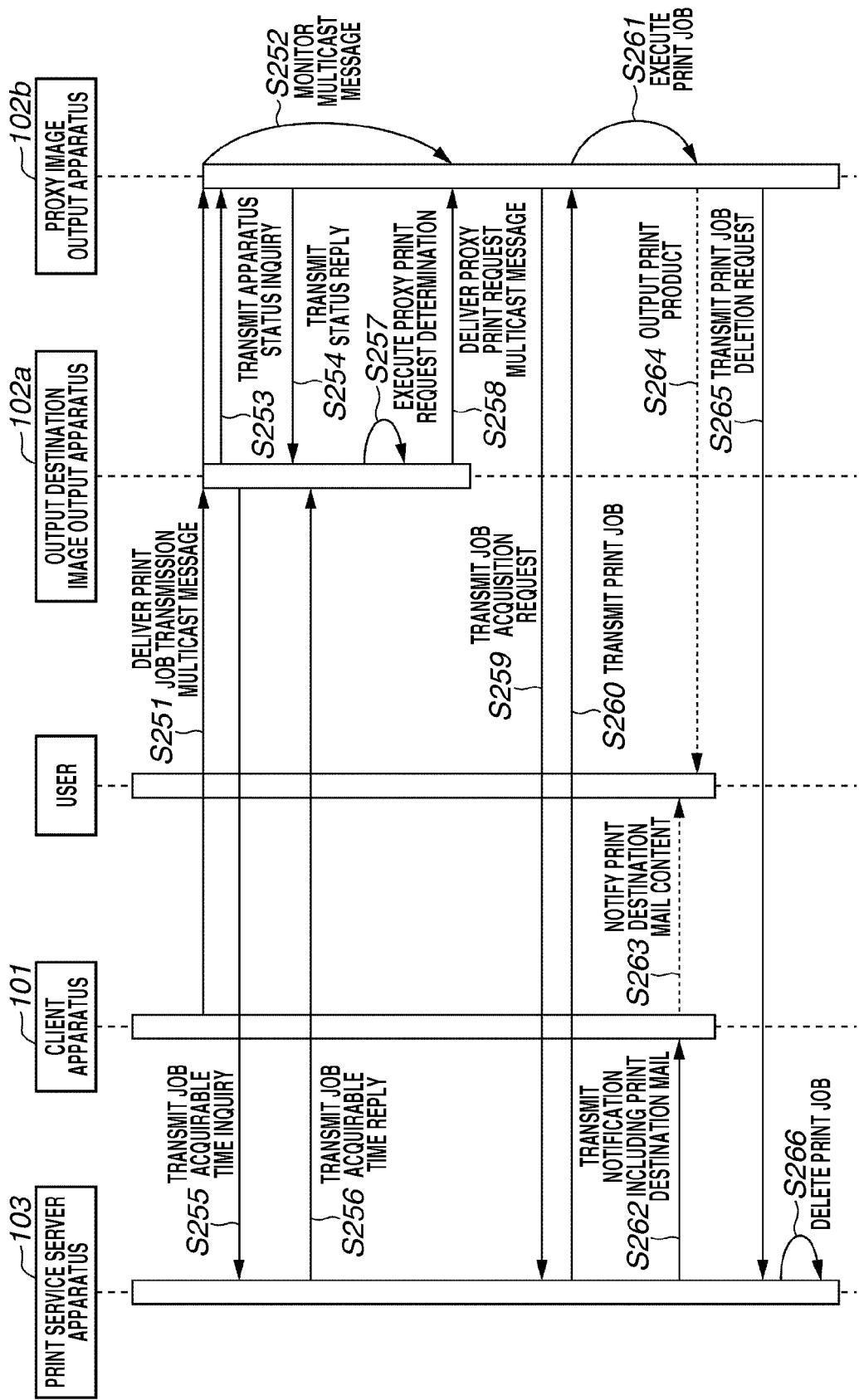
FIG. 6 is a sequence diagram (3) illustrating an example of operational processing that can be performed by the printing system according to the first exemplary embodiment of the present invention.

According to an operational processing example illustrated in FIG. 6, the CPU 142 of the output destination image output apparatus 102a determines to request the proxy image output apparatus 102b to perform the proxy print processing according to the result of the proxy print request determination. Processing to be performed in steps S251 through S256 illustrated in FIG. 6 is similar to the processing performed in steps S213 through S218 illustrated in FIG. 5. Further, processing to be performed in steps S262 through S266 is similar to the processing performed in steps S224 through S228 illustrated in FIG. 5.

In step S257, the output destination image output apparatus 102a executes proxy print request determination. In the proxy print request determination, the CPU 142 of the output destination image output apparatus 102a determines to request the proxy image output apparatus 102b to perform proxy print processing because the apparatus itself is not restored for a while.

Next, in step S258, the CPU 142 of the output destination image output apparatus 102a delivers a proxy print request multicast message via the network 104. The proxy print request multicast message is a message requesting the proxy image output apparatus 102b to perform proxy print processing for the output destination image output apparatus 102a. The proxy print request multicast message includes proxy image output apparatus information included in the print job transmission multicast message and control information instructing the proxy print processing. More specifically, the CPU 142 is functionally operable as a proxy request unit configured to request the proxy image output apparatus 102b to deliver the proxy print request multicast message via the network 104.

Next, the proxy image output apparatus 102b receives the proxy print request multicast message. The proxy image output apparatus 102b determines that the apparatus itself performs print processing with reference to the proxy image output apparatus information included in the received proxy print request multicast message and the control information instructing the proxy print processing.

Subsequently, in step S259, the proxy image output apparatus 102b transmits a print job acquisition request that corresponds to the print processing to the print service server apparatus 103. Subsequently, in step S260, the print service server apparatus 103 transmits a print job that corresponds to the print job acquisition request to the proxy image output apparatus 102b. Then, in step S261, the proxy image output apparatus 102b executes the print job received from the print service server apparatus 103. Further, in step S264, the proxy image output apparatus 102b outputs a print product.

Figure 7:
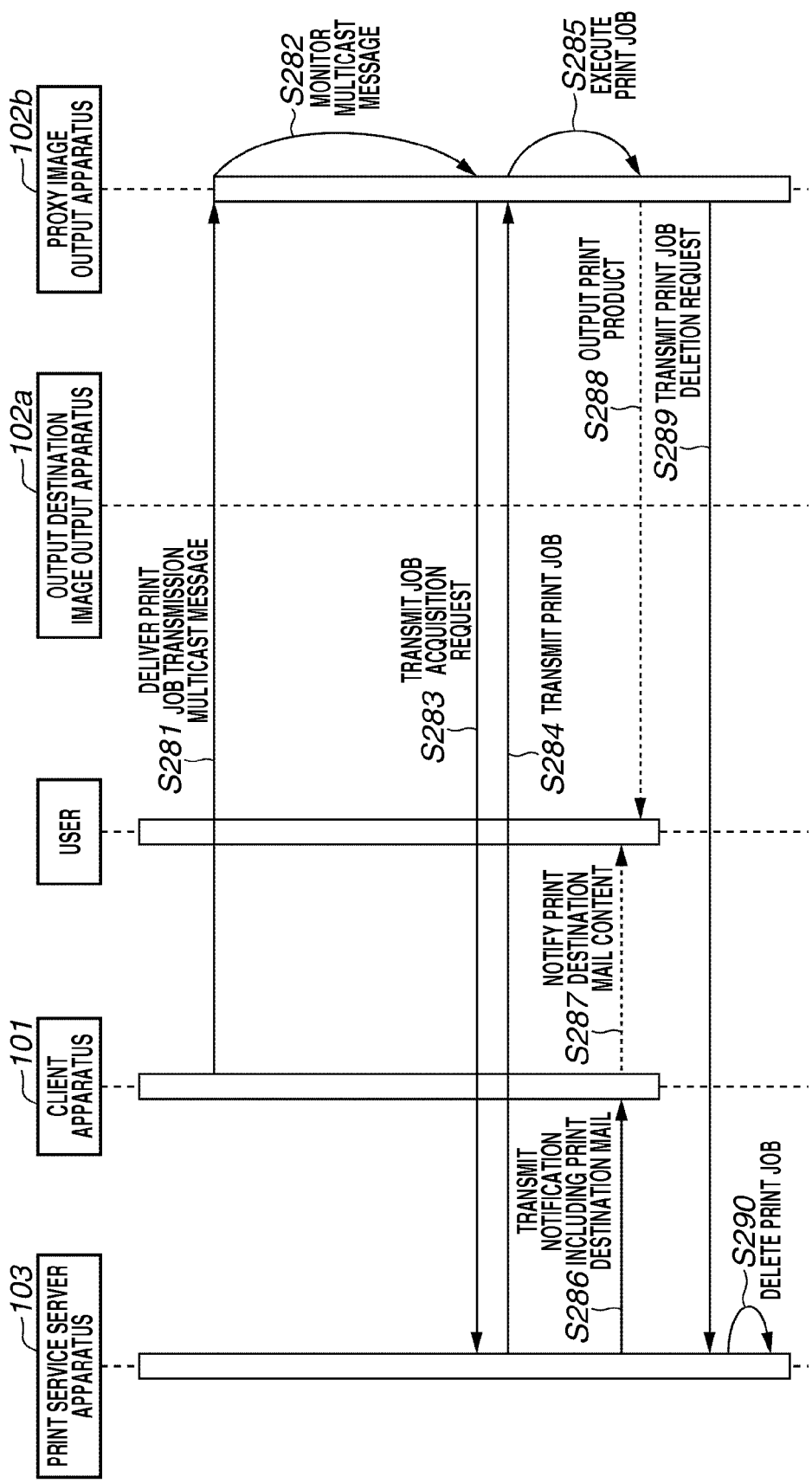
FIG. 7 is a sequence diagram (4) illustrating an example of operational processing that can be performed by the printing system according to the first exemplary embodiment of the present invention.

According to the operational processing example illustrated in FIG. 7, when the output destination image output apparatus 102a cannot transmit any response via the network, for example, in a power-OFF state due to failure, the proxy image output apparatus 102b performs print processing. Processing to be performed in steps S283 through S290 illustrated in FIG. 7 is similar to the processing performed in steps S259 through S266 illustrated in FIG. 6.

In step S282, the proxy image output apparatus 102b monitors the multicast message transmitted from the output destination image output apparatus 102a. According to the illustrated example, it is presumed that the monitoring duration has expired. Accordingly, the proxy image output apparatus 102b stops monitoring the multicast message and determines that the apparatus itself performs the print processing. Then, in step S283, the proxy image output apparatus 102b transmits the print job acquisition request to the print service server apparatus 103.

Figure 8:
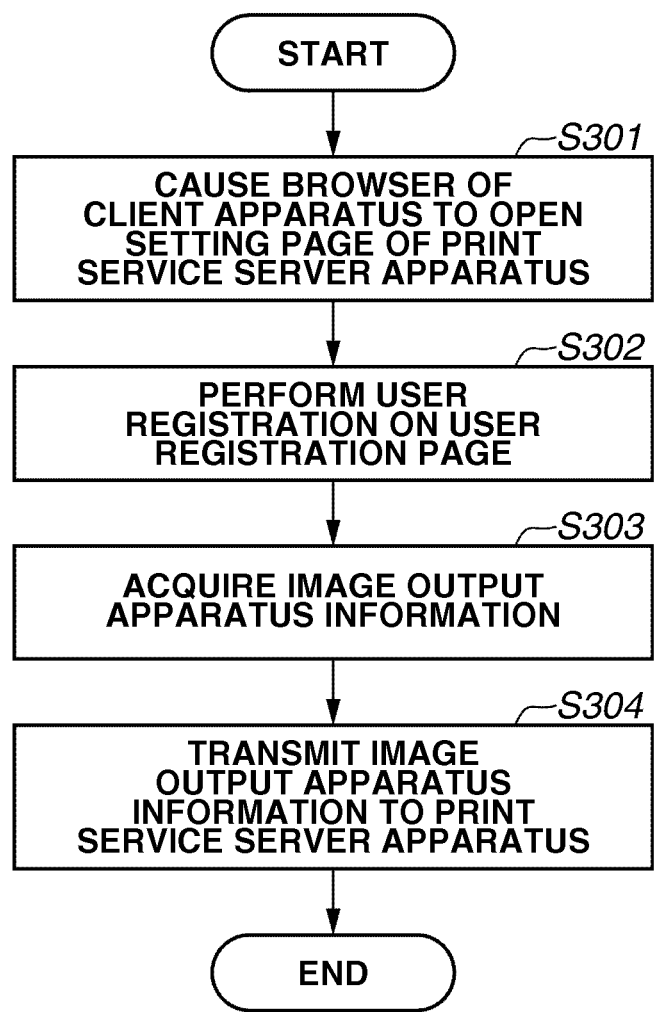
FIG. 8 is a flowchart illustrating an example of image output apparatus information registration processing according to the first exemplary embodiment of the present invention.

FIG. 8 is a flowchart illustrating an example of processing for registering image output apparatus information with the print service server apparatus. First, in step S301, the browser application included in the client apparatus 101 opens a setting page of the print service server apparatus 103 according to an instruction of the user. Therefore, via the browser application, the user inputs address information, such as Uniform Resource Locator (URL) address, of the print service server apparatus 103 to open a site page of the print service server apparatus 103. In this case, the OS 182 of the print service server apparatus 103 executes the web service library 183 loaded into the RAM 172. Thus, the OS 182 transmits the data of the site page prepared beforehand to the browser application of the client apparatus 101 via the network I/F 177.

Subsequently, in step S302, the user opens a user registration page via the site page of the print service server apparatus 103 and inputs user information (e.g., user ID and password) required to use the print service, which is transmitted to the print service server apparatus 103. The OS 182 of the print service server apparatus 103 executes the user registration program 186 loaded into the RAM 172 to register the user ID and the password as user registration information. More specifically, the OS 182 stores the user registration information in the database 190. Through the above-described processing, the user registration (registration of the user ID and the password) is accomplished.

Next, the user registers an image output apparatus that the user wants to operate with the print service server apparatus 103. More specifically, the browser application of the client apparatus 101 opens an image output apparatus registration site page of the print service server apparatus 103 according to a user instruction. In this case, the print service server apparatus 103 transmits a plug-in module included in the image output apparatus registration program 185 to the browser application of the client apparatus 101. The plug-in module is a module capable of acquiring image output apparatus information from an image output apparatus based on information identifying the image output apparatus if it is input by the user.

Subsequently, the user inputs the information identifying the image output apparatus on the image output apparatus registration site page. According to the illustrated example, the user inputs IP address of the image output apparatus. Subsequently, in step S303, the plug-in module received by the browser application acquires image output apparatus information from the image output apparatus that includes the IP address input by the user. For example, the image output apparatus information includes image output apparatus ID, image output apparatus name, and print processing speed (pages/min). For example, the image output apparatus ID is Universal Unique ID (UUID).

In step S304, the plug-in module transmits the acquired image output apparatus information to the print service server apparatus 103. The image output apparatus registration program 185 of the print service server apparatus 103 registers the image output apparatus information received from the plug-in module with the database 190. If the user wants to register the image output apparatus information of a plurality of image output apparatuses with the print service server apparatus 103, the plug-in module repeats the processing in steps S303 and S304 for each of the plurality of image output apparatuses.

In the present exemplary embodiment, the plug-in module is configured to acquire image output apparatus information. However, when the user manually inputs image output apparatus information, the browser application can transmit the input image output apparatus information to the print service server apparatus 103.

Figure 9:
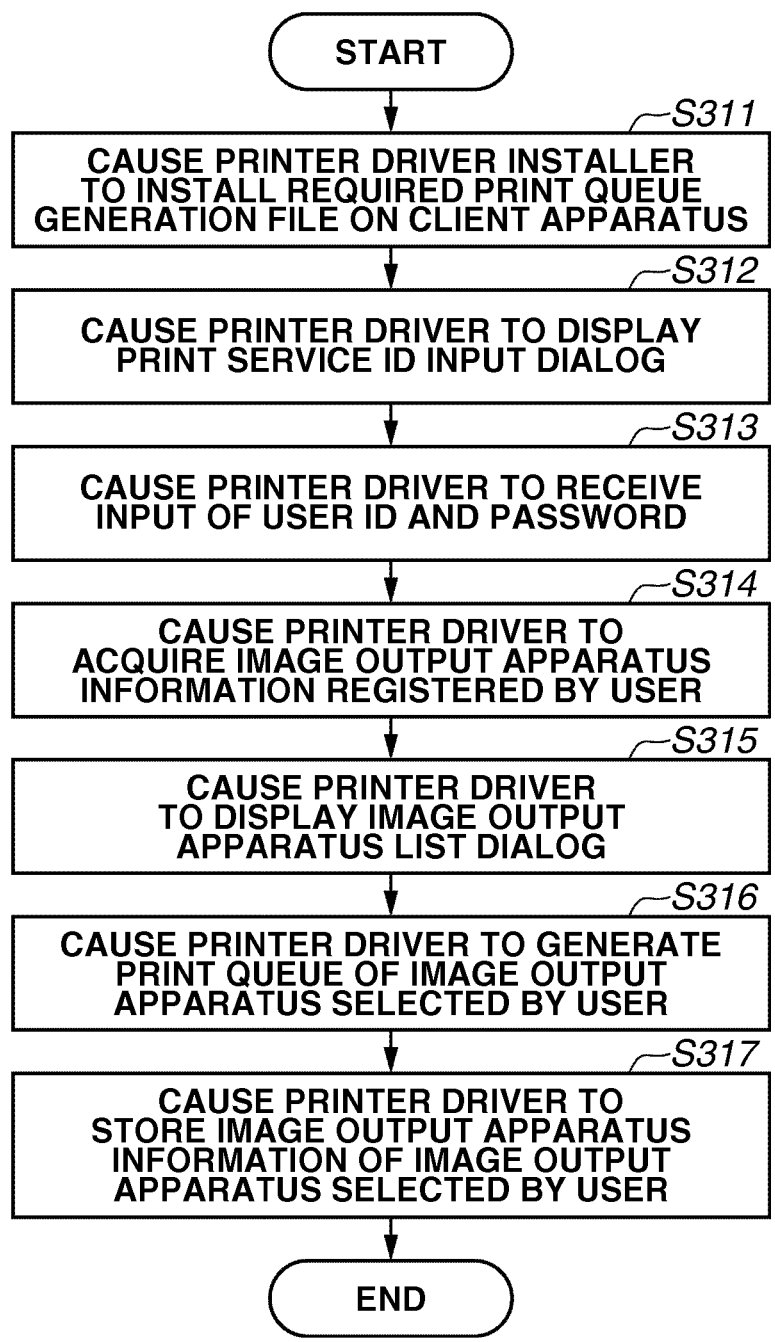
FIG. 9 is a flowchart illustrating an example of print queue generation processing according to the first exemplary embodiment of the present invention.

FIG. 9 is a flowchart illustrating an example of print queue generation processing. More specifically, the processing illustrated in FIG. 9 corresponds to sequential processing in step S201 (i.e., installation of printer driver) through step S205 (i.e., generation of print queue) illustrated in FIG. 4.

The printer driver 134 installed on the client apparatus 101 is a printer driver that designates a specific print service server apparatus 103 as an output destination. Accordingly, the output destination of a print job that corresponds to the print queue generated using the printer driver 134 is the specific print service server apparatus 103. In generation of a print queue, the user may input an address of a print service server apparatus to be used. In this case, the printer driver 134 can designate the print service server apparatus that corresponds to the input address as an output destination of the print job.

First, the printer driver installer 136 is launched on the client apparatus 101 according to a user instruction. Subsequently, the CPU 111 of the client apparatus 101 executes the printer driver installer 136 loaded from the external memory 131 to the RAM 112. Thus, in step S311, the printer driver installer 136 stores a file required to generate the print queue in the printer driver storage area 134 of the external memory 131 associated with the client apparatus 101. Accordingly, the printer driver 134 that is required to generate the print queue can be installed on the client apparatus 101.

Next, the above-described installed printer driver 134 displays a print queue dialog. The print queue dialog is a user interface (UI) that enables users to generate a print queue.

Figure 15A:
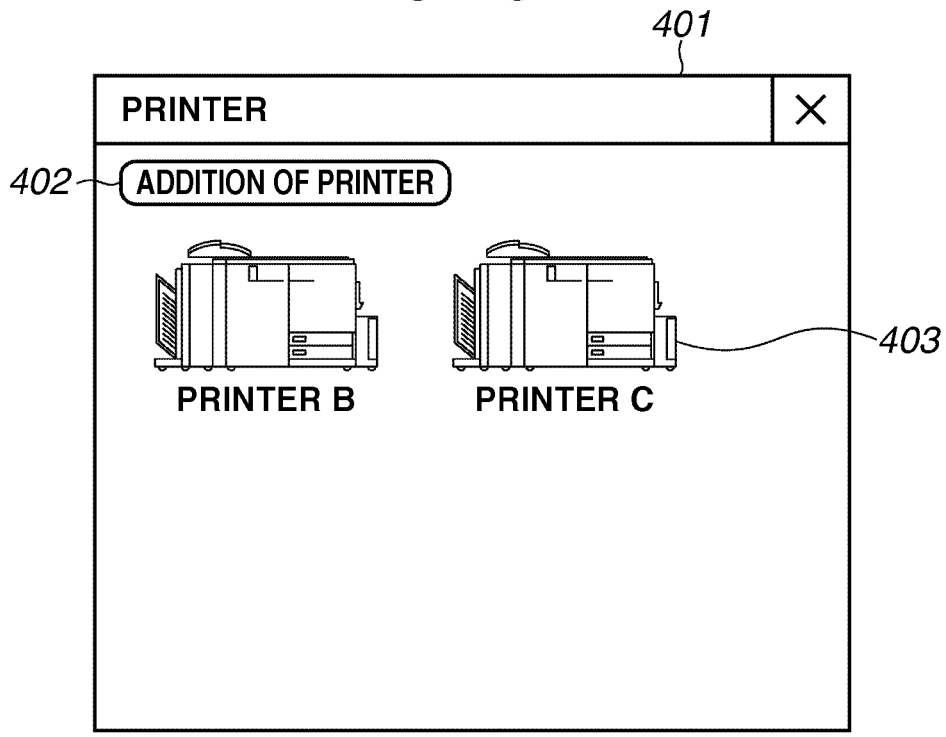
FIGS. 15A and 15B illustrate examples of a print queue dialog.
Figure 15B:
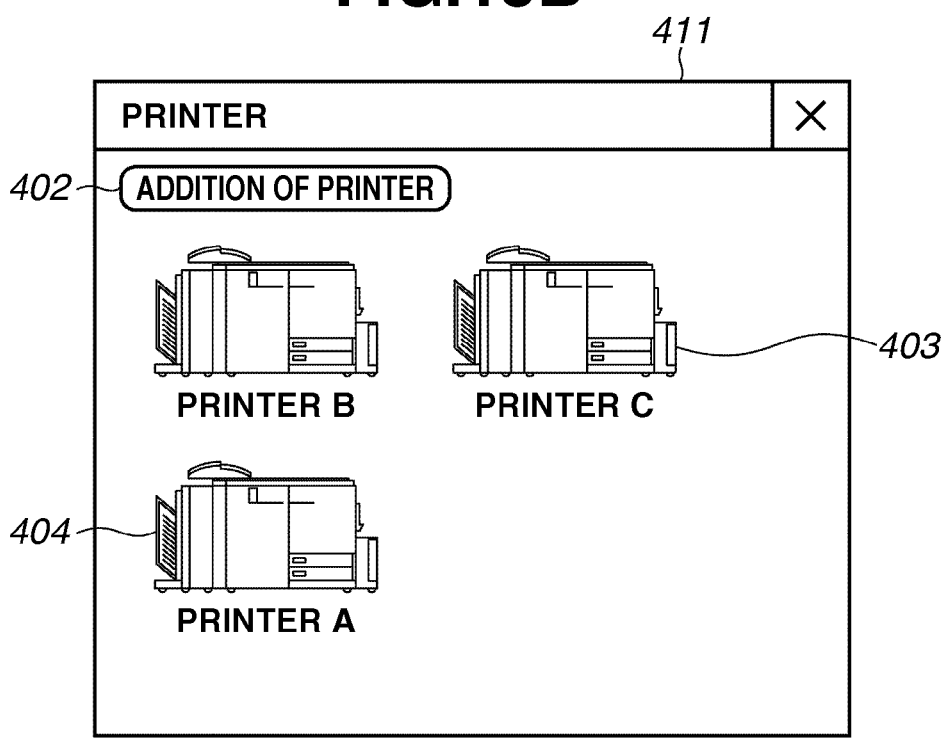

FIGS. 15A and 15B illustrate examples of the print queue dialog. A print queue dialog 401 illustrated in FIG. 15A includes a printer addition button 402. The printer addition button 402 is a button operable to add a print queue. Further, the print queue dialog 401 illustrated in FIG. 15A includes a print queue 403 that has already been generated. According to the illustrated example, a print queue that corresponds to the printer B and a print queue that corresponds to the printer C are displayed. The printer B represents the image output apparatus B (102b). Further, the printer C represents the image output apparatus C (102c).

The user clicks the printer addition button 402 to add a new print queue. In response to a click operation, the OS 132 of the client apparatus 101 loads a printer driver file into the RAM 112 and causes the CPU 111 to execute the loaded printer driver. Thus, in step S312 illustrated in FIG. 9, the printer driver 134 displays a print service ID input dialog. The print service ID input dialog is a UI that enables the user to input the user ID and the password (i.e., the user ID and the password registered in step S302 illustrated in FIG. 8) that are required for the printer driver 134 to access the print service server apparatus 103.

Referring back to FIG. 9, in step S313, the printer driver 134 receives the user ID and the password that the user has input through the print service ID input dialog.

FIGS. 16A, 16B, and 16C illustrate examples of the print service ID input dialog, an image output apparatus list dialog, and a proxy printer selection dialog, respectively. A print service ID input dialog 501 illustrated in FIG. 16A includes a user ID input box 502, a password input box 503, and an OK button 504. The user can input the user ID in the user ID input box 502. The user can input the password in the password input box 503. When the user clicks the OK button 504, the user ID and the password are input to the printer driver 134.

Referring back to FIG. 9, the printer driver 134 transmits the input user ID and the input password to the print service server apparatus 103. The print service server apparatus 103 receives the user ID and the password transmitted from the printer driver 134.

Then, the image output apparatus registration program 185 acquires image output apparatus information (registered beforehand by the user) that corresponds to the user ID from the database 190 and transmits a response including the acquired image output apparatus information to the printer driver 134.

Thus, in step S314, the printer driver 134 acquires the image output apparatus information that corresponds to the user. According to the illustrated example, it is presumed that the printer driver 134 acquires image output apparatus information of a plurality of image output apparatuses. Therefore, in step S315, the printer driver 134 displays the image output apparatus list dialog. The image output apparatus list dialog is a UI that enables the user to select one of the image output apparatuses designated by the acquired image output apparatus information as an image output apparatus for which a print queue is generated.

An image output apparatus list dialog 511 illustrated in FIG. 16B includes an image output apparatus selection dialog 512 and an OK button 513. A list of image output apparatuses that correspond to the image output apparatus information acquired by the printer driver 134 in step S314 illustrated in FIG. 9 can be displayed in the image output apparatus selection dialog 512 to enable the user to select a desired one of the listed image output apparatuses. If the user selects an image output apparatus in the image output apparatus selection dialog 512 and clicks the OK button 513, the selected image output apparatus is notified to the printer driver 134.

Referring back to FIG. 9, in step S316, the printer driver 134 generates a print queue that corresponds to the image output apparatus selected by the user. For example, the user may select the printer A. In this case, the printer A is the print queue that outputs a print job to be executed by the image output apparatus A (102a). More specifically, according to the illustrated example, the user selects the image output apparatus A.

If the user clicks the OK button 513, the result that the printer A has been selected is notified to the printer driver 134. When the printer driver 134 receives the notification, the printer driver 134 generates the printer A. The printer driver 134 stores information relating to the generated print queue in the image output apparatus information storage area 135. The information relating to the print queue includes, at least, information indicating the print service server apparatus 103 (i.e., the print job output destination of the print queue) and information indicating the image output apparatus that executes the print job output by the print queue. The print service server apparatus 103 (i.e., the print job output destination of the print queue) is an output destination set beforehand by the printer driver 134.

FIG. 15B illustrates a printer dialog in a state where a print queue 404 representing the printer A has been newly generated. The printer B is the print queue that outputs the print job to be executed by the image output apparatus B (102b). The printer C is the print queue that outputs the print job to be executed by the image output apparatus C (102c). In the present exemplary embodiment, the printer A and the printer B have the same output destination (i.e., the print service server apparatus 103). On the other hand, the output destination of the printer C is a print service server apparatus other than the print service server apparatus 103.

Referring back to FIG. 9, in step S317, the printer driver 134 stores image output apparatus information of the image output apparatus selected by the user via the image output apparatus list dialog 511 (i.e., one of the image output apparatuses that correspond to the image output apparatus information acquired in step S314) in the image output apparatus information storage area 135. For example, the printer driver 134 stores image output apparatus information of each of the image output apparatuses A, B, and C in the image output apparatus information storage area 135.

Through the above-described procedure, three print queues of printers A, B, and C can be generated. Hereinafter, example print processing for outputting a print job to the output destination image output apparatus when the user selects the proxy image output apparatus is described. According to the print processing, when the user instructs a print of a document through the application, the user performs print settings while designating the printer A. More specifically, the user designates the image output apparatus A as the output destination image output apparatus 102a. Further, the user designates the image output apparatus B as the proxy image output apparatus 102b. The image output apparatus A and the image output apparatus B designate the same print service server apparatus as the output destination.

In the present exemplary embodiment, the image output apparatus ID of the image output apparatus A is "c4aa5f44-4ae5-48e5-8f2a-7ddf46d30c49." Further, the image output apparatus ID of the image output apparatus B is "178ae8c1-e341-43a5-94ad-b47856b748be." These image output apparatus IDs are included in the image output apparatus information stored in the image output apparatus information storage area 135. Further, the job ID of the print job generated by the printer driver 134 in response to a user's print instruction is "6bdd1fc6-810f-11d0-bec7-08002be2092f."

Figure 10:
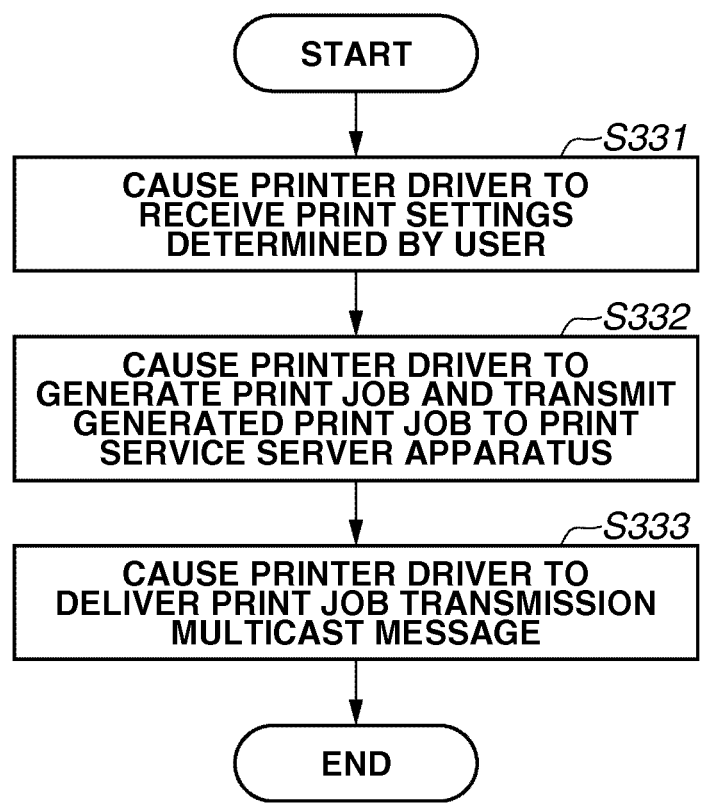
FIG. 10 is a flowchart illustrating an example of print job transmission multicast execution processing according to the first exemplary embodiment of the present invention.

FIG. 10 is a flowchart illustrating an example of print job transmission multicast execution processing. First, to perform printing, the user launches an application on the client apparatus 101 and opens a document to be printed. Subsequently, the user selects a print menu from the application menu.

In response to the selecting operation, the OS 132 of the client apparatus 101 loads the printer driver 134 into the RAM. 112 and causes the CPU 111 to execute the loaded printer driver 134. Thus, the printer driver 134 displays a print setting dialog (not illustrated). The print setting dialog is a UI that enables the user to perform print settings that correspond to the print job. On the print setting dialog, the user selects the printer A as the print queue that outputs an output printer (more specifically, print job).

Further, on the print setting dialog, the user performs print settings for the print job that corresponds to the output printer. Thus, the image output apparatus A that corresponds to the printer A can be selected as the output destination image output apparatus 102a, and the print settings for the print job to be output by the printer A can be accomplished.

In step S331, the printer driver 134 receives the print settings that have been performed by the user. In step S331, the printer driver 134 displays the proxy printer selection dialog. The proxy printer selection dialog is a UI that enables the user to select a proxy printer. The proxy printer is a print queue that outputs a print job to be executed by the proxy image output apparatus 102b. Accordingly, the proxy printer selection dialog has the capability of selecting the proxy image output apparatus 102b.

The printer driver 134 receives an input of the proxy printer selected by the user via the proxy printer selection dialog. According to the illustrated example, the printer selected as the proxy printer is the printer B. More specifically, the image output apparatus B is selected as the proxy image output apparatus 102b.

A proxy printer selection dialog 601 illustrated in FIG. 16C includes a check box 602, a proxy printer selection list 603, an OK button 604, and a cancel button 605.

The check box 602 indicates the necessity of selecting the proxy printer. If a check mark is input in the check box 602, it indicates that the user selects the proxy printer. Candidates of the proxy printer can be displayed in the proxy printer selection list 603 to enable the user to select a desired proxy printer. When the OK button 604 is clicked, the setting contents of the proxy printer selection dialog are validated and the dialog is closed. When the cancel button 605 is clicked, the setting contents of the proxy printer selection dialog are nullified and the dialog is closed.

The printer driver 134 can determine the above-described candidates of the proxy printer in the following manner. When the printer driver 134 displays the proxy printer selection dialog 601, the printer driver 134 executes the following processing with reference to the information relating to the print queue stored in the image output apparatus information storage area 135. The printer driver 134 designates print queues other than the printer A as the candidates of the proxy printer, if the output destination of the designated print queues is the print service server apparatus 103 (i.e., the output destination of the printer A). Then, the printer driver 134 displays the determined candidates of the proxy printer in the proxy printer selection list 603.

Referring back to FIG. 10, the user inputs a print instruction. In response to the instruction, the printer driver 134 of the client apparatus 101 generates a print job and stores the generated print job in the output printer. Then, in step S332, the printer driver 134 transmits the print job stored in the output printer to the print service server apparatus 103. In addition to the print job, the printer driver 134 transmits the job ID, the output destination image output apparatus ID, the proxy image output apparatus ID, and the job ticket to the print service server apparatus 103.

The job ID is identification information that can uniquely identify each print job. When the printer driver 134 generates a print job, the printer driver 134 generates a job ID of the print job. The job ID is, for example, UUID. The job ID can be any other arbitrary ID. The output destination image output apparatus ID is the image output apparatus ID that corresponds to the output destination image output apparatus 102a, i.e., one of the image output apparatus IDs stored in the image output apparatus information storage area 135.

The proxy image output apparatus ID is the image output apparatus ID that corresponds to the proxy image output apparatus 102b, i.e., one of the image output apparatus IDs stored in the image output apparatus information storage area 135. The job ticket includes the print settings having been set by the user via the print setting dialog. The job ticket has an arbitrary format to describe a print attribute.

In step S333 illustrated in FIG. 10, the printer driver 134 delivers the print job transmission multicast message via the network 104 and terminates the processing of the flowchart illustrated in FIG. 10. The print job transmission multicast message delivered via the network 104 informs that the print job has been transmitted. More specifically, the print job transmission multicast includes information indicating that the print job has been transmitted, the job ID, the output destination image output apparatus ID, the proxy image output apparatus ID, the print processing speed of the output destination image output apparatus, and the print processing speed of the proxy image output apparatus.

The print processing speed of the output destination image output apparatus is the print processing speed of the image output apparatus that corresponds to the output destination image output apparatus 102a, i.e., one of the print processing speeds of the image output apparatuses stored in the image output apparatus information storage area 135. The print processing speed of the proxy image output apparatus is the print processing speed of the image output apparatus that corresponds to the proxy image output apparatus 102b, i.e., one of the print processing speeds of the image output apparatuses stored in the image output apparatus information storage area 135.

FIGS. 17A, 17B, 17C, 17D, and 17E illustrate example messages that can be transmitted via the network. An example illustrated in FIG. 17A is a print job transmission multicast message 700, which includes key-and-value combinations. The format expressing each key includes a colon (:) attached to the tail of an alphanumeric character string and a space following the colon in which a value corresponding to the key can be described. Further, the format includes the line feed that follows each combination of "key" and "value." The above-described format is a mere example, and any other format capable of associating each key with its value is employable.

The multicast message 700 illustrated in FIG. 17A includes message key 701 that can identify the type of the multicast. According to the illustrated example, "Sent Print Job" is described as a setting value of the message key. The setting value "Sent Print Job" indicates that the print job has been transmitted, more specifically, that the multicast message 700 is the print job transmission multicast message.

The multicast message 700 includes job ID 702, which indicates a job ID of the print job transmitted by the printer driver 134 (i.e., the transmission source of the multicast message 700). The multicast message 700 includes an output destination image output apparatus ID 703. According to the illustrated example, the output destination image output apparatus indicates an ID of the image output apparatus A.

The printer driver 134 (i.e., the transmission source) acquires the output destination image output apparatus ID from the image output apparatus information storage area 135 and sets the acquired ID information in the multicast message 700. The image output apparatus analyzes the received multicast message 700, and determines whether the apparatus itself is currently designated as the output destination image output apparatus.

The multicast message 700 includes proxy image output apparatus ID 704. According to the illustrated example, the proxy image output apparatus ID indicates a unique ID of the image output apparatus B. The printer driver 134 (i.e., the transmission source) acquires the proxy image output apparatus ID from the image output apparatus information storage area 135 and sets the acquired ID information in the multicast message 700. The image output apparatus analyzes the multicast message 700, if it is received, and determines whether the apparatus itself is currently designated as the proxy image output apparatus.

The multicast message 700 includes print processing speed 705 of the output destination image output apparatus 102*a*. According to the illustrated example, the print processing speed of the output destination image output apparatus 102*a* is 60 pages/min. The multicast message 700 includes print processing speed 706 of the proxy image output apparatus 102*b*. According to the illustrated example, the print processing speed of the proxy image output apparatus 102*b* is 30 pages/min.

The multicast message 700 includes the number of pages 707 of the print job generated by the printer driver 134. According to the illustrated example, the number of pages of the print job is 35 pages. The multicast message 700 includes print job acquisition destination address 708. The print job acquisition destination address is the address of the print service server apparatus (a print job acquisition request destination) that is designated by the image output apparatus that has determined that the apparatus itself performs the print processing. According to the illustrated example, the print job acquisition destination address is http://pservice.abc.jp/ipp/.

Figure 11:
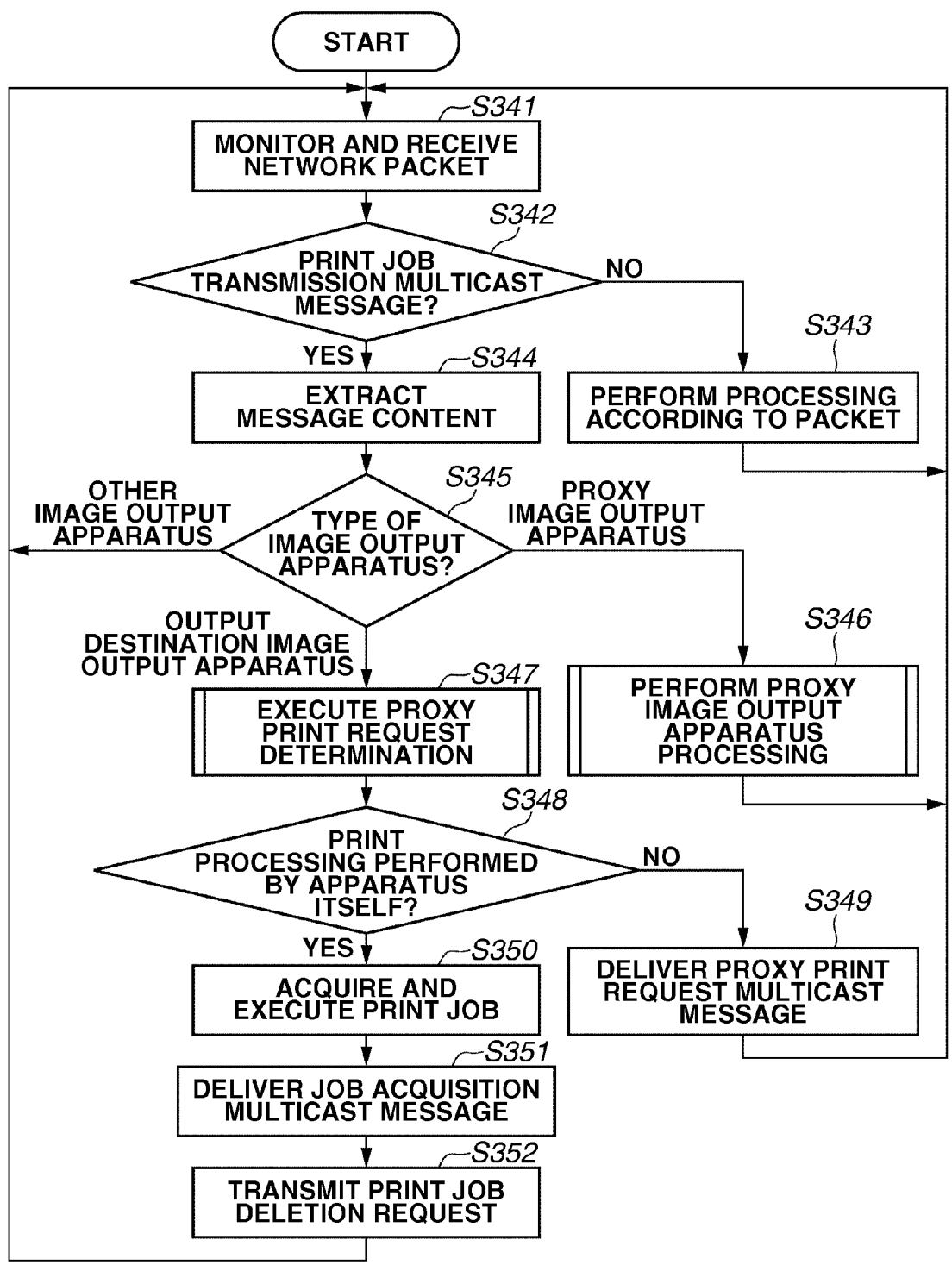
FIG. 11 is a flowchart illustrating an example of processing that can be performed by the image output apparatus, which corresponds to a processing variable portion, according to the first exemplary embodiment of the present invention.

For example, when an image output apparatus acquires a print job from the print service server apparatus 103, the image output apparatus accesses the above-described address http://pservice.abc.jp/ipp/ and transmits the image output apparatus ID of the apparatus itself and the job ID of the print job to be acquired. On the other hand, the print service server apparatus 103 checks whether the image output apparatus ID is already registered. When the image output apparatus ID is already registered, the print service server apparatus 103 transmits the print job that corresponds to the job ID received from the image output apparatus (i.e., one of the print jobs dedicated to the image output apparatus) to the image output apparatus FIG. 11 is a flowchart illustrating an example of processing that can be performed by the image output apparatus, which corresponds to the processing variable portion 1000 illustrated in FIG. 5. Job ID, output destination image output apparatus ID, and proxy image output apparatus ID in the following description are similar to the job ID, the output destination image output apparatus ID, the proxy image output apparatus ID included in the multicast message 700 illustrated in FIG. 17A.

First, in step S341, the image output apparatus 102 monitors and receives a packet transmitted via the network 104. In step S341, the CPU 142 included in the image output apparatus 102 loads the print control program 154 stored in the external memory 151 into the RAM 143 and executes the loaded print control program 154. The print control program 154 monitors the network I/F 145 and receives the packet.

Next, in step S342, the image output apparatus 102 checks the type of the received packet and determines whether the message included in the received packet is the print job transmission multicast message. The image output apparatus 102 refers to the message key included in the message and, if the setting value of the message key is "Sent Print Job", the image output apparatus 102 determines that the received message is the print job transmission multicast message. Then, the processing proceeds to step S344.

If the message included in the packet is not the print job transmission multicast message (NO in step S342), then in step S343, the image output apparatus 102 performs processing according to the received packet. In this case, the processing proceeds to step S341. For example, if the received packet includes a print job, the image output apparatus 102 executes the print job. Further, if the received packet is a request requiring transmission of configuration information of the image output apparatus 102, the image output apparatus 102 transmits a reply including the configuration information to a request source.

In step S344, the print control program 154 running on the image output apparatus 102 extracts the content of the print job transmission multicast message. If the message included in the received packet is, for example, the message 700 illustrated in FIG. 17A, the print control program 154 extracts the information included in the message 700. For example, the print control program 154 extracts "6bdd1fc6-810f-11d0-bec7-08002be2092f" as the job ID.

Further, the print control program 154 extracts "c4aa5f44-4ae5-48e5-8f2a-7ddf46d30c49" as the output destination image output apparatus ID. Further, the print control program 154 extracts "178ae8c1-e341-43a5-94ad-b47856b748be" as the proxy image output apparatus ID. Further, the print control program 154 extracts "http://pservice.abc.jp/ipp/" as the print job acquisition destination address, from the message.

According to the above-described extracted information, it is understood that the output destination image output apparatus is the image output apparatus A (102*a*) and the proxy image output apparatus is the image output apparatus B (102*b*). The print control program 154 stores the above-described extracted information in the multicast data storage area 155 of the external memory 151.

Next, in step S345, the CPU of the image output apparatus 102 determines whether the apparatus itself is the output destination image output apparatus 102*a*, the proxy image output apparatus 102*b*, or other image output apparatus. More specifically, the CPU 142 of the image output apparatus 102 is functionally operable as a first determination unit configured to execute determination processing in step S345, based on the output destination image output apparatus ID and the proxy image output apparatus ID included in the information extracted from the above-described message.

If the image output apparatus ID of the apparatus itself coincides with the output destination image output apparatus ID included in the information extracted from the above-described message, the image output apparatus 102 determines that the apparatus itself is the output destination image output apparatus 102*a*. Then, the processing proceeds to step S347. Then, in step S347, the image output apparatus 102 executes proxy print request determination.

If the image output apparatus ID of the apparatus itself coincides with the proxy image output apparatus ID included in the information extracted from the above-described message, the image output apparatus 102 determines that the apparatus itself is the proxy image output apparatus 102*b*. Then, the processing proceeds to step S346. Then, in step S346, the image output apparatus 102 performs proxy image output apparatus processing. According to the illustrated example, the image output apparatus B executes the proxy image output apparatus processing.

If the image output apparatus ID of the apparatus itself does not coincide with the output destination image output apparatus ID and the proxy image output apparatus ID, the image output apparatus 102 determines that the apparatus itself is not any one of the output destination image output apparatus 102a and the proxy image output apparatus 102b. Then, the processing returns to step S341.

Next, in step S348, the image output apparatus 102 determines whether the apparatus itself performs the print processing based on the result of the proxy print request determination. If the image output apparatus 102 determines that the apparatus itself performs the print processing (YES in step S348), the processing proceeds to step S350. Then, in step S350, the CPU 142 of the image output apparatus 102 acquires the print job from the print service server apparatus 103 and executes the acquired print job. More specifically, the CPU 142 is functionally operable as a job execution unit configured to acquire a print job that corresponds to the print processing from the print service server apparatus 103 and to execute the acquired print job.

The processing to be performed in step S350 is described in detail below. First, the image output apparatus 102 acquires the job ID from the multicast data storage area 155. For example, the job ID acquired by the image output apparatus 102 is "6bdd1fc6-810f-11d0-bec7-08002be2092f." Next, the image output apparatus 102 acquires the print job acquisition destination address from the multicast data storage area 155. The image output apparatus 102 transmits a print job acquisition request including the job ID and the image output apparatus ID to the print service server apparatus 103 indicated by the acquired print job acquisition destination address. Then, the image output apparatus 102 acquires the print job, as a response replying to the print job acquisition request, from the print service server apparatus 103.

Next, in step S351, the CPU 142 of the image output apparatus 102 delivers a job acquisition multicast message via the network 104. More specifically, the CPU 142 is functionally operable as a job acquisition multicast unit configured to perform the following processing. When the CPU 142 determines that the apparatus itself performs the print processing (YES in step S348) and has acquired the print job from the print service server apparatus 103, the CPU 142 delivers the message indicating that the apparatus itself has acquired the print job via the network 104.

An example illustrated in FIG. 17B is a job acquisition multicast message 720, which includes message key 721 that can identify the type of the multicast. According to the illustrated example, "Destination Printer Pulled Print Job" is described as a setting value of the message key. The setting value "Destination Printer Pulled Print Job" indicates that the image output apparatus (i.e., the transmission source of the message) has acquired the print job.

Referring back to FIG. 11, in step S352, the image output apparatus 102 transmits a print job deletion request to the print service server apparatus 103. Then, the processing returns to step S341.

Through the above-described determination processing performed in step S348, if the image output apparatus 102 determines that the apparatus itself does not perform the print processing, then in step S349, the image output apparatus 102 delivers a proxy print request multicast message via the network 104. Then, the processing returns to step S341.

An example illustrated in FIG. 17C is a proxy print request multicast message 740, which includes message key 741 that can identify the type of the multicast. According to the illustrated example, "Destination Printer Cannot Pull Print Job" is described as a setting value of the message key. The message key value "Destination Printer Cannot Pull Print Job" indicates that the message is the proxy print request multicast message.

More specifically, the message key value can be functionally regarded as control information that instructs the proxy image output apparatus corresponding to proxy image output apparatus ID 744 to perform proxy print processing. The proxy image output apparatus ID 744 is the proxy image output apparatus ID included in the print job transmission multicast message illustrated in FIG. 17A. When the proxy image output apparatus that corresponds to the proxy image output apparatus ID receives the proxy print request multicast message 740 illustrated in FIG. 17C, the proxy image output apparatus performs the following processing. The proxy image output apparatus acquires, for the output destination image output apparatus 102a, the print job from the print service server apparatus 103 and executes the acquired print job.

Figure 12:
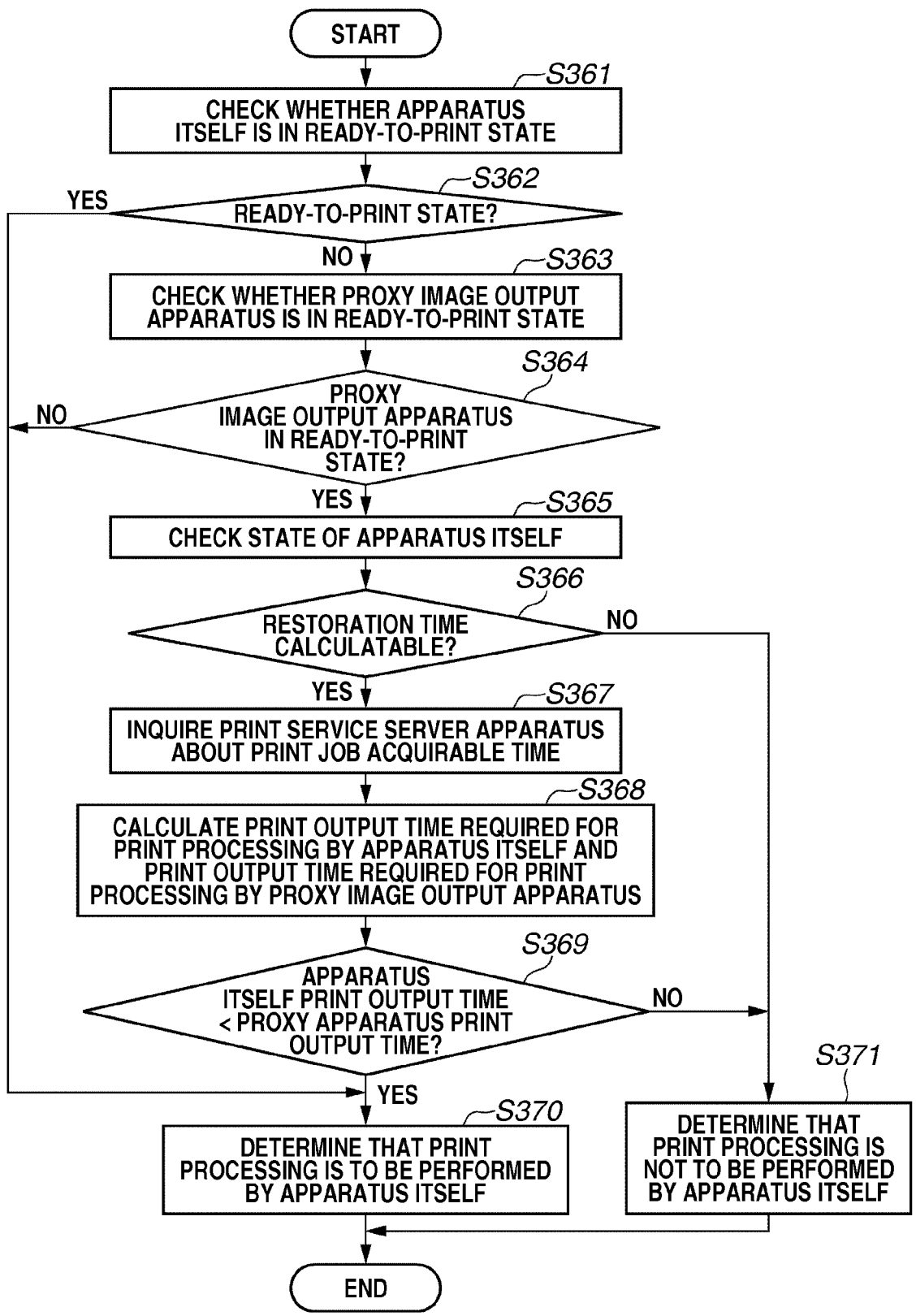
FIG. 12 is a flowchart illustrating an example of proxy print request determination according to the first exemplary embodiment of the present invention.

FIG. 12 is a flowchart illustrating an example of the proxy print request determination to be performed in step S347 illustrated in FIG. 11. In the present exemplary embodiment, it is presumed that the image output apparatus A (102a) is the output destination image output apparatus and the image output apparatus B (102b) is the proxy image output apparatus. Accordingly, the image output apparatus A performs the processing of the flowchart illustrated in FIG. 12.

First, in step S361, the image output apparatus A checks whether the apparatus itself is ready to print. Subsequently, in step S362, the image output apparatus A determines whether the apparatus itself is ready to print based on the result of the confirmation in step S361.

If the image output apparatus A determines that the apparatus itself is ready to print (YES in step S362), the processing proceeds to step S370. If the image output apparatus A determines that the apparatus itself is not ready to print (NO in step S362), the processing proceeds to step S363.

Next, in step S363, the CPU 142 of the image output apparatus A checks whether the image output apparatus B (i.e., the proxy image output apparatus) is ready to print. The processing to be performed in step S363 is described in detail below. The image output apparatus A delivers a status request multicast message via the network 104. The status request multicast message requests transmission of information indicating the print status of the proxy image output apparatus.

An example illustrated in FIG. 17D is a status request multicast message 760, which includes message key 761 that can identify the type of the multicast. According to the illustrated example, "Request Status" is described as a setting value of the message key. The message key value "Request Status" indicates that the message is the status request multicast message. More specifically, the status request multicast message 760 requests transmission of the print status of the proxy image output apparatus that corresponds to proxy image output apparatus ID 763.

The proxy image output apparatus ID used by the CPU 142 of the image output apparatus A is the proxy image output apparatus ID included in the print job transmission multicast message. The status request multicast message 760 includes image output apparatus ID 762 of the message transmission source image output apparatus (i.e., the image output apparatus A). The image output apparatus B receives the status request multicast message and transmits a response including the print status of the apparatus itself to the image output apparatus A. In other words, the image output apparatus B delivers a status response multicast message.

More specifically, the CPU 142 is functionally operable as an acquisition unit configured to acquire information indicating the apparatus state of the proxy image output apparatus based on the proxy image output apparatus ID included in the print job transmission multicast message if it is determines that the apparatus itself is the output destination image output apparatus 102a.

An example illustrated in FIG. 17E is a status response multicast message 780, which includes message key 781 that can identify the type of the multicast. According to the illustrated example, "Reply Status" is described as a setting value of the message key. The message key value "Reply Status" indicates that the message is the status response multicast message. More specifically, the status response multicast message 780 is a message usable when the proxy image output apparatus corresponding to proxy image output apparatus ID 783 transmits a response including print status 784 of the apparatus itself to the image output apparatus 782.

According to the illustrated example, "Ready to Print" is set as a key value of the print status 784. Accordingly, the proxy image output apparatus (i.e., the image output apparatus B) is ready to print. If the image output apparatus B is not ready to print, "Busy" is set as a status key value.

Referring back to FIG. 12, in step S364, the image output apparatus A receives the status response multicast message from the image output apparatus B. The image output apparatus A determines whether the image output apparatus B is ready to print based on the content of the received status response multicast message. If it is determined that the image output apparatus B is not ready to print (NO in step S364), the processing proceeds to step S370. If it is determined that the image output apparatus B is ready to print (YES in step S364), the processing proceeds to step S365.

If the image output apparatus B cannot return any response for some reason, no status response multicast message is transmitted. In this case, the image output apparatus A determines whether a predetermined period has elapsed (i.e., whether the time-out has occurred). If the time-out has occurred, the image output apparatus A determines that the image output apparatus B is not ready to print. In this case, the processing proceeds to step S370.

In step S365, the image output apparatus A checks the state of the apparatus itself. Then, in step S366, the image output apparatus A determines whether the restoration time of the apparatus itself can be calculated based on the confirmed state of the apparatus itself. More specifically, the image output apparatus A determines whether the state of the apparatus itself is restorable depending on an external factor or an internal factor.

For example, the apparatus itself is restorable depending on various external factors, such as lack of paper, lack of toner, or maintenance work by a service person. Further, the apparatus itself is restorable depending on various internal factors, such as state of sleep, calibration to adjust the image quality, or presence of a job in the job queue.

If the state of the apparatus itself is restorable depending on an internal factor, the image output apparatus A determines that the restoration time of the apparatus itself can be calculated. Then, the processing proceeds to step S367. If the state of the apparatus itself is restorable depending on an external factor, the image output apparatus A determines that the restoration time of the apparatus itself cannot be calculated. Then, the processing proceeds to step S371.

In step S367, the image output apparatus A inquires the print service server apparatus 103 about print job acquirable time and acquires the print job acquirable time. The inquiry target print job is a print job that corresponds to print processing instructed by the print job transmission multicast message (see FIG. 17A).

The print job acquirable time is dependent on the print attribute setting of the print job and the amount of the print job. More specifically, the print service server apparatus 103 performs sequential page processing after receiving the print job. For example, according to an ordinary print setting, the print service server apparatus 103 can transmit the print job to the image output apparatus at the timing when the processing of the first page is accomplished.

Further, for example, according to a bookbinding print setting, the print service server apparatus 103 cannot transmit the print job to the image output apparatus until the processing for all pages is completed and the imposition for a bookbinding layout is completed. Further, when a larger amount of print job is stored in the print job queue of the print service server apparatus 103, the image output apparatus requires a longer time to acquire the print job. Accordingly, the print service server apparatus 103 calculates the print job acquirable time based on the print attribute setting of the print job and the amount of the print job and transmits the calculated print job acquirable time to the image output apparatus A.

Next, in step S368, the CPU 142 of the image output apparatus A calculates a print output time required for the print processing to be performed by the apparatus itself and a print output time required for the print processing to be performed by the image output apparatus B. More specifically, if it is determined that the apparatus itself is not ready to print and the image output apparatus B is ready to print (NO in step S362 and YES in step S364) the CPU 142 performs the following processing. The CPU 142 calculates a print output time of the image output apparatus A (which may be referred to as a "first print processing time") and a print output time of the image output apparatus B (which may be referred to as a "second print processing time").

Hereinafter, the processing to be performed in step S368 is described in detail. First, the CPU 142 of the image output apparatus A calculates the restoration time of the apparatus itself. Then, the CPU 142 calculates the print output time of the image output apparatus A according to the following formula (1).

Print output time of image output apparatus $A$=MAX (restoration time, print job acquirable time)+Print time of job queue print job+Print time of print job acquired from print service server apparatus (1)

In formula (1), "MAX (restoration time, print job acquirable time)" represents a longer one of the restoration time and the print job acquirable time. The "print time of job queue print job" is the time required to execute the print job stored in the job queue included in the image output apparatus A. The "print time of print job acquired from the print service server apparatus" (hereinafter, referred to as a "print time A") is the time required for the image output apparatus A to execute the print job acquired from the print service server apparatus 103.

Further, the image output apparatus A calculates the print output time of the image output apparatus B according to the following formula (2).

Print output time of image output apparatus $B$=Print job acquirable time+Print time of print job acquired from print service server apparatus (2)

In the formula (2), the "print time of print job acquired from print service server apparatus" (hereinafter, referred to as "print time B") is the time required for the image output apparatus B to execute the print job acquired from the print service server apparatus 103.

The image output apparatus A calculates the print times A and B based on the number of pages (707) of the print job and the print processing speeds (705 and 706), which are set in the print job transmission multicast message (FIG. 17A).

For example, a document to be printed by the user includes 60 pages. The print processing speed of the image output apparatus A is 60 pages/min. The print processing speed of the image output apparatus B is 30 pages/min. The image output apparatus A divides 60 pages by the print processing speed of the image output apparatus A. Thus, the image output apparatus A obtains a calculated value "1 (minute)" as the print time A. The image output apparatus A divides 60 pages by the print processing speed of the image output apparatus B. Thus, the image output apparatus A obtains a calculated value "2 (minutes)" as the print time B.

It is now assumed that the print job acquirable time is 100 seconds and the restoration time of the image output apparatus A is 250 seconds. Further, there is not any print job in the job queue of the image output apparatus A. In this case, the print output times of the image output apparatuses A and B can be calculated in the following manner.

Print output time of image output apparatus A=MAX (250 seconds, 100 seconds)+0+60/60 minutes=310 seconds Print output time of image output apparatus B=100 seconds+60/30 minutes=220 seconds More specifically, the CPU 142 calculates a print output time that corresponds to the image forming apparatus A based on, at least, the print processing speed of the image forming apparatus A, the amount of the print job, and the print job acquirable time. Further, the CPU 142 calculates a print output time that corresponds to the image forming apparatus B based on, at least, the print processing speed of the image forming apparatus B, the amount of the print job, and the print job acquirable time.

Next, in step S369, the image output apparatus A determines whether the print output time of the image output apparatus A is shorter than the print output time of the image output apparatus B. If it is determined that the print output time of the image output apparatus A is shorter than the print output time of the image output apparatus B (YES in step S369), then in step S370, the image output apparatus A determines that the apparatus itself performs print processing.

If the print output time of the image output apparatus A is longer than the print output time of the image output apparatus B (NO in step S369), then in step S371, the image output apparatus A determines that the apparatus itself does not perform the print processing. More specifically, the CPU 142 of the image output apparatus A determines to request the image output apparatus B to perform proxy print processing. Through the above-described determination processing in step S369, the image output apparatus A can determine either the apparatus itself or the image output apparatus B, which is shorter in total print output time, as an image output apparatus that performs print processing.

Through the above-described processing in steps S363 through S370, the CPU 142 of the image output apparatus A is functionally operable as a second determination unit configured to perform the following determination processing based on the apparatus state of the image output apparatus A and the apparatus state of the image output apparatus B. The CPU 142 determines whether the image output apparatus A performs print processing instructed by a print job multicast message transmitted from the client apparatus 101 or requests the image output apparatus B to perform proxy print processing.

Further, if it is determined that the apparatus itself is ready to print (YES in step S362), then in step S370, the CPU 142 of the image output apparatus A determines that the image output apparatus A performs print processing. Further, if it is determined that the apparatus itself is not ready to print and the image output apparatus B is not ready to print (NO in step S362 and NO in step S364), then in step S370, the CPU 142 determines that the image output apparatus A performs print processing.

Figure 13:
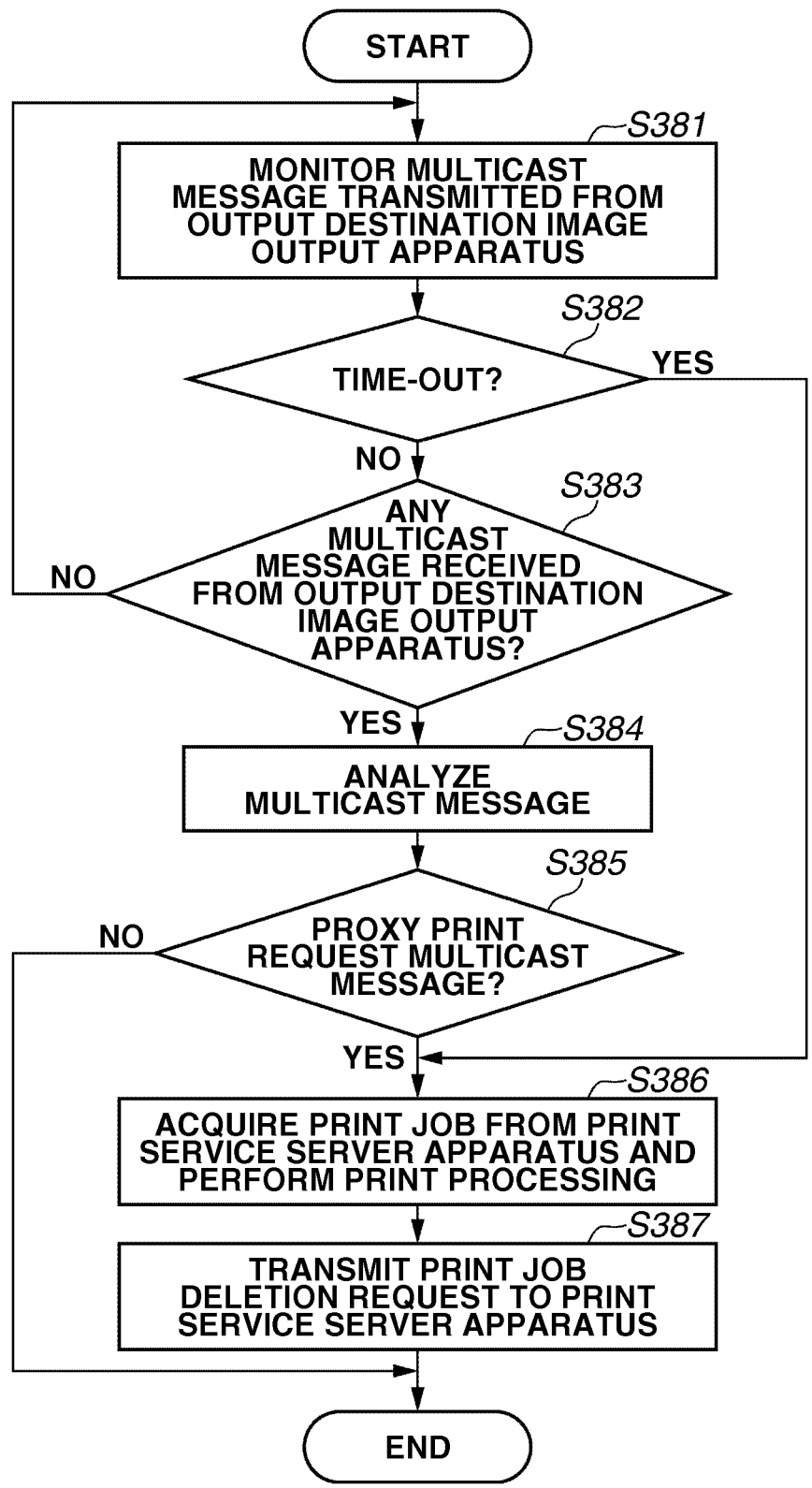
FIG. 13 is a flowchart illustrating an example of proxy image output apparatus processing according to the first exemplary embodiment of the present invention.

FIG. 13 is a flowchart illustrating an example of the proxy image output apparatus processing to be performed in step S346 illustrated in FIG. 11. First, in step S381, the CPU 142 of the image output apparatus B (i.e., the proxy image output apparatus 102*b*) monitors a multicast message transmitted from the image output apparatus A (i.e., the output destination image output apparatus 102*a*) via the network 104. More specifically, the CPU 142 is functionally operable as a message reception unit configured to monitor and receive a multicast message via the network 104.

Next, in step S382, the image output apparatus B determines whether the monitoring time has exceeded a predetermined time. More specifically, the image output apparatus B determines whether the time-out has occurred. If the time-out has not occurred (NO in step S382), the processing proceeds to step S383. If the time-out has occurred (YES in step S382), the image output apparatus B determines that the image output apparatus A (i.e., the output destination image output apparatus 102*a*) is not ready to print. Therefore, the processing proceeds to step S386.

In step S386, the CPU 142 of the image output apparatus B acquires the print job from the print service server apparatus 103 and outputs a print product. More specifically, the image output apparatus B performs proxy print processing for the image output apparatus A.

More specifically, the CPU 142 monitors the multicast message delivered via the network 104 for a predetermined period after it is determined that the apparatus itself is the proxy image output apparatus 102*b*. Then, if the monitoring duration of the multicast message transmitted via the network 104 has exceeded the predetermined period, the CPU 142 acquires the print job from the print service server apparatus 103 and executes the acquired print job.

In step S383, the image output apparatus B determines whether the multicast message has been received from the image output apparatus A. If it is determined that the image output apparatus B has not received the multicast message from the image output apparatus A (NO in step S383), the processing returns to step S381. If it is determined that the image output apparatus B has received the multicast message from the image output apparatus A (YES in step S383), the processing proceeds to step S384.

Next, in step S384, the image output apparatus B analyzes the received multicast message. Then, in step S385, the CPU 142 of the image output apparatus B determines whether the received message is the proxy print request multicast message. In this case, the multicast message received by the image output apparatus B is the job acquisition multicast message (see FIG. 17B) or the proxy print request multicast message (see FIG. 17C).

If the received message is not the proxy print request multicast message, more specifically, when the received message is the job acquisition multicast message, the CPU 142 of the image output apparatus B stops monitoring the multicast message transmitted via the network 104 and terminates the processing of the flowchart illustrated in FIG. 13.

If it is determined that the received message is the proxy print request multicast message (YES in step S385), then in step S386, the CPU 142 of the image output apparatus B performs print processing for the image output apparatus A. More specifically, when it is determined that the apparatus itself is the proxy image output apparatus 102*b* and the received multicast message is the proxy print request multicast message, the CPU 142 acquires the print job from the print service server apparatus 103 and executes the acquired print job. Next, in step S387, i.e., after completing the print processing, the image output apparatus B transmits a print job deletion request to the print service server apparatus 103 and terminates the processing of the flowchart illustrated in FIG. 13.

Figure 14:
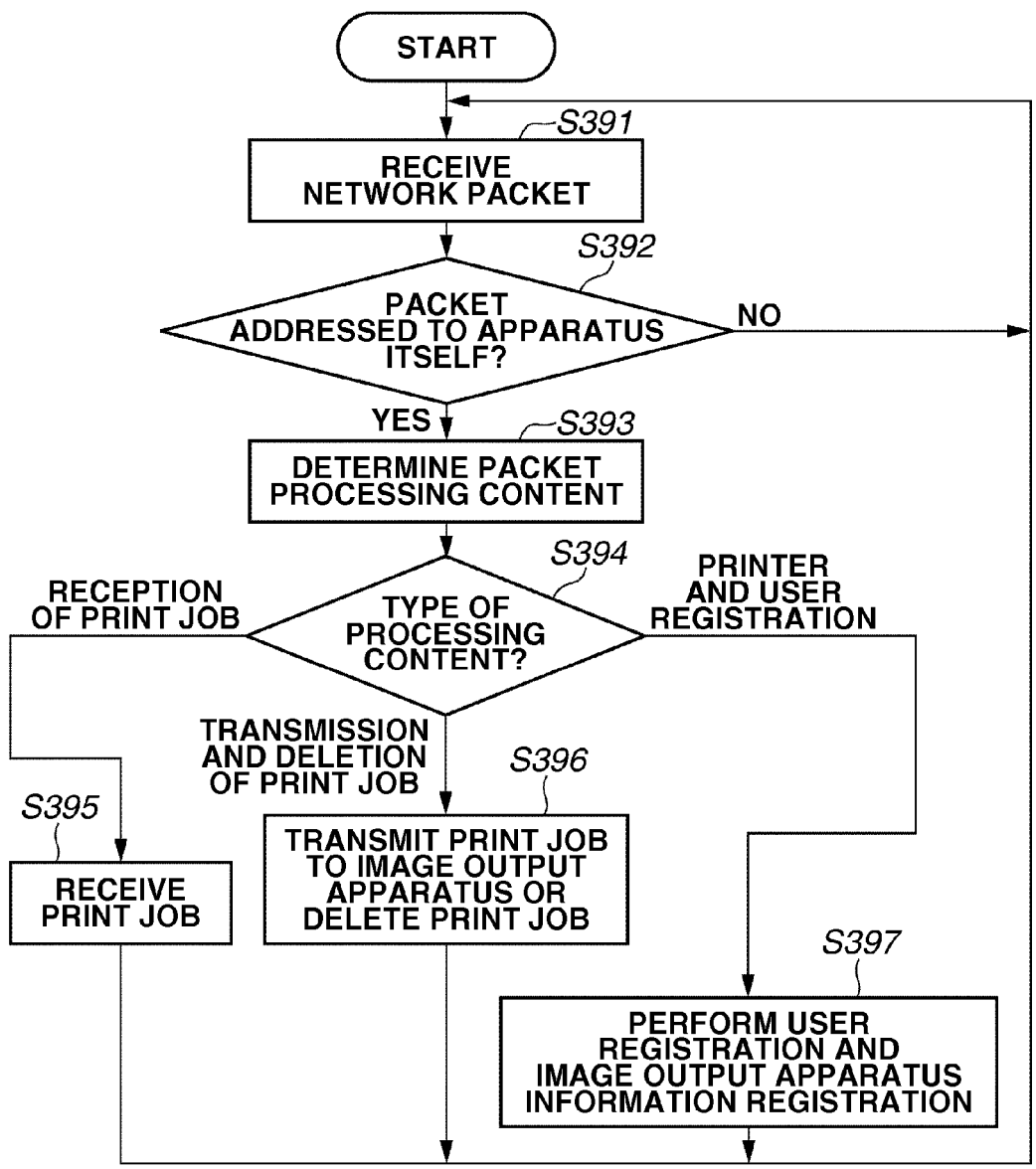
FIG. 14 is a flowchart illustrating an example of operational processing that can be performed by the print service server apparatus according to the first exemplary embodiment of the present invention.

FIG. 14 is a flowchart illustrating an example of operational processing that can be performed by the print service server apparatus 103. To enable the print service server apparatus 103 to provide a service constantly as a server, the CPU 171 loads the print service program 184 into the RAM 172 beforehand so that the program 184 can be executed by the print service server apparatus 103.

In step S391, the print service server apparatus 103 receives a network packet. Subsequently, in step S392, the print service server apparatus 103 determines whether the received network packet is addressed to the apparatus itself. If the print service server apparatus 103 determines that the received network packet is not addressed to the apparatus itself (NO in step S392), the processing returns to step S391. If the print service server apparatus 103 determines that the received network packet is addressed to the apparatus itself (YES in step S392), the processing proceeds to step S393.

Next, in step S393, the print service server apparatus 103 identifies the type of the received network packet and determines the processing content that the packet instructs. Next, in step S394, the print service server apparatus 103 determines whether the processing content is reception of a print job, transmission and deletion of a print job, or printer and user registration.

The reception of a print job indicates that the print service server apparatus 103 receives a print job that the client apparatus 101 has input to the print service server apparatus 103. The transmission and deletion of a print job indicates that the print service server apparatus 103 inputs a print job to the transmission source of the print job acquisition request (i.e., the output destination image output apparatus 102*a* or the proxy image output apparatus 102*b*) or deletes the print job. The printer and user registration indicates the user registration processing for the user of the client apparatus 101 (see step S302 illustrated in FIG. 8) and the registration processing for the image output apparatus information (see step S304 illustrated in FIG. 8).

If it is determined that the processing content is the reception of a print job, the processing proceeds to step S395. Then, in step S395, the print job reception program 187 of the print service server apparatus 103 receives the print job transmitted from the printer driver 134 of the client apparatus 101. The print job reception program 187 stores the received print job in the print job spool area 191 of the print service server apparatus 103. More specifically, the print job reception program 187 extracts the job ID, the output destination image output apparatus ID, and the proxy image output apparatus ID from the print job. The print job reception program 187 stores the extracted information in the print job spool area 191 while associating the extracted information with the print job. Then, the processing returns to step S391 upon completion of the processing in step S395.

If it is determined that the processing content is transmission and deletion of a print job, the processing proceeds to step S396. In step S396, the print data transmission program 188 of the print service server apparatus 103 transmits the print job to the image output apparatus 102 (i.e., the transmission source of the print job acquisition request) or deletes the print job according to the print job deletion request.

In step S396, the print data transmission program 188 determines whether the image output apparatus 102 (i.e., the transmission source of the print job acquisition request) is currently registered with the database 190. If it is determined that the image output apparatus 102 is currently registered with the database 190, the print data transmission program 188 transmits the print job to the image output apparatus 102. Then, the processing returns to step S391 upon completion of the processing in step S396.

If it is determined that the processing content is printer and user registration, the processing proceeds to step S397. Then, in step S397, the print service server apparatus 103 performs user registration and image output apparatus information registration. Then, the processing returns to step S391.

The printing system according to the first exemplary embodiment brings the following effects when the print processing is performed via the print service server apparatus 103. More specifically, according to the above-described print processing system, when the output destination image output apparatus 102*a* cannot perform print processing, the proxy image output apparatus 102*b* can perform proxy print processing when both the output destination image output apparatus 102*a* and the proxy image output apparatus 102*b* are managed by the same print service server apparatus 103.

Next, a printing system according to a second exemplary embodiment of the present invention is described. The printing system according to the second exemplary embodiment has a configuration similar to that of the printing system described in the first exemplary embodiment with reference to FIG. 1. In the above-described first exemplary embodiment, the print service server apparatus 103 transmits the print destination mail (i.e., the electronic mail including information indicating the image output apparatus that has acquired the print job) to the client apparatus 101 (see step S224 illustrated in FIG. 5).

However, a general mail application inquires a Post Office Protocol server (i.e., POP server) about the presence of a delivered mail at constant time intervals. Accordingly, the notification of the print output destination (i.e., the notification of the image output apparatus that has acquired the print job) may be delayed if the transmission timing of the mail is inappropriate.

Therefore, in the second exemplary embodiment, the print service server apparatus 103 notifies the print output destination according to the following procedure. First, after transmitting the print job to the print service server apparatus 103, the printer driver 134 of the client apparatus 101 launches a daemon service to receive a print completion multicast message. The daemon service is a program that can receive the job acquisition multicast message transmitted from the image output apparatus 102 (i.e., the print output destination).

More specifically, the daemon service is functionally operable as a reception unit configured to perform the following processing when a print job is input to the print service server apparatus 103. The daemon service receives a message indicating that the image output apparatus 102 acquires the print job, which is delivered by the image output apparatus 102 via the network 104, when the image output apparatus 102 acquires the above-described input print job from the print service server apparatus 103 and executes the acquired print job.

In the second exemplary embodiment, the image output apparatus 102 that functions as the print output destination (i.e., either the output destination image output apparatus 102*a* or the proxy image output apparatus 102*b*) delivers a job acquisition multicast message via the network. A job acquisition multicast message delivered by the output destination image output apparatus 102*a* is the above-described message illustrated in FIG. 17B. A job acquisition multicast message delivered by the proxy image output apparatus 102*b* is the above-described message illustrated in FIG. 17B, although the message key value is changed to "Proxy Printer Pulled Print Job."

The daemon service of the client apparatus 101 receives the job acquisition multicast message and identifies the image output apparatus 102 that serves as the print output destination based on the content of the received job acquisition multicast message. More specifically, the daemon service acquires ID information of the print output destination (i.e., image output apparatus), which is included in the job acquisition multicast message. Then, the daemon service acquires a record that coincides with the acquired image output apparatus ID from the information stored in the image output apparatus information storage area 135 and displays an image output apparatus name included in the acquired record. Thus, the user can confirm the image output apparatus that serves as the print output destination. In other words, in the printing system according to the second exemplary embodiment, the print service server apparatus 103 is not required to send the print destination mail to the client apparatus 101.

Next, a printing system according to a third exemplary embodiment of the present invention is described. In the above-described first exemplary embodiment, the printer driver 134 is installed on the client apparatus 101. However, the printer driver 134 may not be installed on a portable terminal represented by a smartphone due to an operating system installed thereon. Accordingly, in the third exemplary embodiment, an application that is included in the client apparatus to print a user document has a function equivalent to that of the printer driver 134 described in the first exemplary embodiment.

Figure 18:
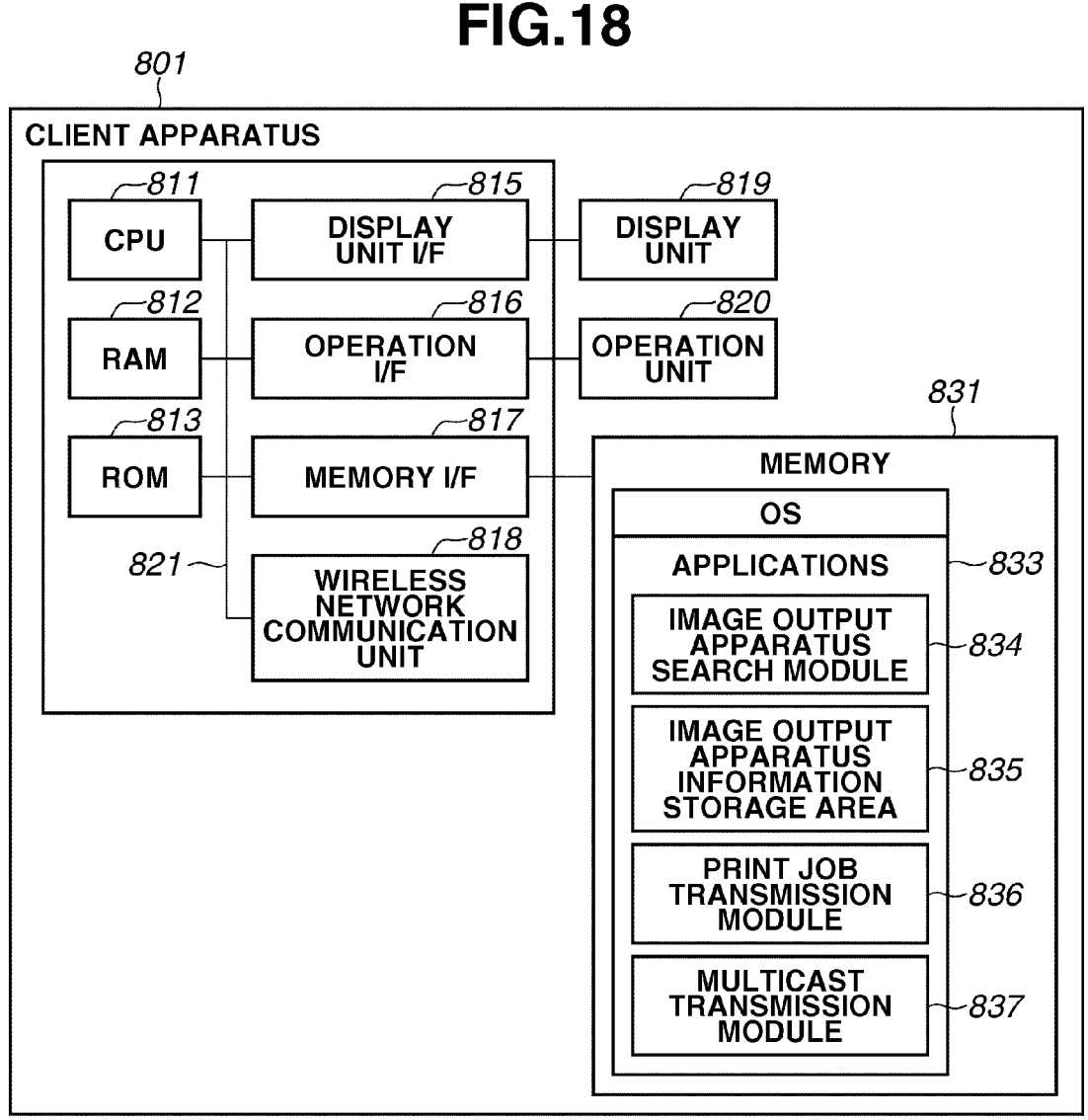
FIG. 18 illustrates an example configuration of a client apparatus according to a third exemplary embodiment of the present invention.

FIG. 18 illustrates an example configuration of a client apparatus according to the third exemplary embodiment. The printing system illustrated in FIG. 18 includes a client apparatus 801, instead of using the client apparatus 101 illustrated in FIG. 1.

The client apparatus 801 can perform wireless communication. The client apparatus 801 includes a CPU 811 through a memory I/F 817 that are functionally equivalent to the CPU 111 through the external memory I/F 117 illustrated in FIG. 2. Further, a system bus 821 is functionally similar to the system bus 121 illustrated in FIG. 2. A display unit 819 and an operation unit 820 are functionally similar to the display unit 119 and the keyboard illustrated in FIG. 2.

The client apparatus 801 includes a wireless network communication unit 818, which is functionally operable as a processing unit configured to perform wireless communications. The wireless network communication unit 818 may include a built-in memory. A memory 831 is usable to install OS and applications wirelessly or via a maintenance cable, or usable to update the OS and applications. The memory 831 stores an installed OS 832 and applications 833. The applications 833 include various modules.

In the third exemplary embodiment, an image output apparatus search module 834 searches for the image output apparatus 102 via the network 104 and displays a list of the search result on an operation screen included in the display unit 819.

Further, the image output apparatus search module 834 acquires image output apparatus information of the image output apparatus 102 and stores the acquired information in an image output apparatus information storage area 835. The content of the acquired image output apparatus information is similar to the content of the image output apparatus information described in the first exemplary embodiment.

More specifically, the image output apparatus search module 834 is functionally operable as a search unit configured to search for an image output apparatus via the network 104 and acquire image output apparatus information of the image output apparatus. Further, the image output apparatus search module 834 is functionally operable as a display unit configured to display the acquired image output apparatus information.

A user of the client apparatus 801 refers to the image output apparatus information displayed on the operation screen in designating the output destination image output apparatus 102a and the proxy image output apparatus 102b. The CPU 811 of the client apparatus 801 selects the output destination image output apparatus 102a and the proxy image output apparatus 102b based on a user designation operation.

When the user inputs a print instruction, a print job transmission module 836 generates a print job and transmits the generated print job to the print service server apparatus 103. After transmitting the print job, the print job transmission module 836 instructs a multicast transmission module 837 to deliver the print job transmission multicast message via the network 104. In the third exemplary embodiment, the application included in the client apparatus 801 to print the user document has the function of the printer driver 134 described in the first exemplary embodiment.

In the printing system according to the third exemplary embodiment, the client apparatus 801 can acquire image output apparatus information using the image output apparatus search module 834 that has the function equivalent to the printer driver 134.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-172182 filed Aug. 5, 2011, which is hereby incorporated by reference herein in its entirety.

What is claimed is:

1. A printing system comprising:
   at least one image output apparatus;
   a server apparatus that manages each of the at least one image output apparatus as a print job transmission destination; and
   an information processing apparatus that inputs a print job to the server apparatus and instructs the at least one image output apparatus to receive the print job from the server apparatus and to perform print processing based on the received print job,
   wherein the information processing apparatus comprises:
      a job input unit configured to input the print job to the server apparatus;
      a selection unit configured to select an execution apparatus that operates as an image output apparatus that performs print processing and a proxy apparatus that operates as an image output apparatus that performs print processing on behalf of the execution apparatus, wherein the proxy apparatus is managed by the server apparatus that manages the execution apparatus; and a multicast unit configured to deliver a multicast message relating to print instruction information, which is information instructing execution of the print processing and includes information relating to at least the selected execution apparatus and the proxy apparatus, and wherein the at least one image output apparatus comprises:

an instruction reception unit configured to receive the print instruction information;

a first determination unit configured to determine whether the at least one image output apparatus is the execution apparatus or the proxy apparatus based on information relating to the execution apparatus and the proxy apparatus included in the received print instruction information;

an acquisition unit configured to acquire, if the first determination unit determines that the at least one image output apparatus is the execution apparatus, state information of the proxy apparatus based on information relating to the proxy apparatus included in the print instruction information;

a second determination unit configured to determine whether the at least one image output apparatus operates as the execution apparatus that performs print processing instructed by the print instruction information or requests the proxy apparatus to perform proxy print processing, based on state information of the at least one image output apparatus and the acquired state information of the proxy apparatus;

a proxy request unit configured to deliver a multicast message requesting the proxy apparatus to perform proxy print processing if the second determination unit determines that the at least one image output apparatus requests the proxy apparatus to perform proxy print processing;

a job execution unit configured to acquire a print job that corresponds to the print processing from the server apparatus and to execute the acquired print job if the second determination unit determines that the at least one image output apparatus operates as the execution apparatus that performs print processing; and a message reception unit configured to monitor and receive the multicast message transmitted if the first determination unit determines that the at least one image output apparatus is the proxy apparatus, wherein the job execution unit is configured to acquire the print job that corresponds to the print processing from the server apparatus and to execute the acquired print job if the first determination unit determines that the at least one image output apparatus is the proxy apparatus and the message reception unit receives the message requesting the proxy apparatus to perform proxy print processing.

2. The printing system according to claim 1, wherein the second determination unit is further configured to determine that the at least one image output apparatus operates as the execution apparatus that performs print processing when the at least one image output apparatus is ready to print or when the proxy apparatus is not ready to print and the at least one image output apparatus is not ready to print.

3. The printing system according to claim 2, wherein the second determination unit is further configured to:

calculate a first print processing time required for the at least one image output apparatus to perform the print processing and a second print processing time required for the proxy apparatus to perform the proxy print processing when the at least one image output apparatus is not ready to print and the proxy apparatus is ready to print;

determine that the at least one image output apparatus operates as the execution apparatus that performs the print processing when the first print processing time is shorter than the second print processing time; and determine that the at least one image output apparatus requests the proxy apparatus to perform the proxy print processing when the first print processing time is longer than the second print processing time.

4. The printing system according to claim 3, wherein the information relating to the execution apparatus and the proxy apparatus, which is included in the print instruction information, includes a print processing speed of the execution apparatus, a print processing speed of the proxy apparatus, and an amount of the print job, wherein the second determination unit is further configured to:

acquire a print job acquirable time that corresponds to the print processing instructed by the print instruction information from the server apparatus when the at least one image output apparatus is not ready to print and the proxy apparatus is ready to print;

calculate the first print processing time based on at least the print processing speed of the execution apparatus, the amount of the print job, and the print job acquirable time; and calculate the second print processing time based on at least the print processing speed of the proxy apparatus, the amount of the print job, and the print job acquirable time.

5. The printing system according to claim 4, wherein the second determination unit is further configured to:

determine whether a restoration time of the at least one image output apparatus can be calculated when the at least one image output apparatus is not ready to print and the proxy apparatus is ready to print;

determine that the at least one image output apparatus requests the proxy apparatus to perform the proxy print processing when it is determined that the restoration time of the at least one image output apparatus cannot be calculated; and calculate the first print processing time based on the restoration time, the print processing speed of the execution apparatus, the amount of the print job, and the print job acquirable time when it is determined that the restoration time of the at least one image output apparatus can be calculated.

6. The printing system according to claim 1, wherein the at least one image output apparatus further comprises a job acquisition multicast unit configured to deliver a multicast message indicating that the execution apparatus acquires the print job if the second determination unit determines that the at least one image output apparatus operates as the execution apparatus that performs the print processing and the job execution unit acquires the print job that corresponds to the print processing from the server apparatus, and wherein the message reception unit is configured to stop monitoring the multicast message if the received message is the message indicating that the execution apparatus acquires the print job.

7. The printing system according to claim 1, wherein the message reception unit is configured to monitor the multicast message for a predetermined period after the first determination unit determines that the at least one image output apparatus is the proxy apparatus, and
wherein the job execution unit is configured to acquire the print job corresponding to the print processing from the server apparatus and to execute the acquired print job when a monitoring duration of the multicast message has exceeded the predetermined period.

8. The printing system according to claim 1, wherein the information processing apparatus further comprises a reception unit configured to receive a multicast message indicating that the at least one image output apparatus acquires the print job, wherein the multicast message is delivered when the at least one image output apparatus acquires the print job from the server apparatus and executes the acquired print job, in a case where the print job is input to the server apparatus.

9. The printing system according to claim 1, wherein the information processing apparatus further comprises:
a search unit configured to search for and acquire information relating to the at least one image output apparatus; and
a display unit configured to display the acquired information relating to the at least one image output apparatus on an operation screen,
wherein the selection unit is configured to select the execution apparatus capable of operating as the at least one image output apparatus that performs the print processing and the proxy apparatus capable of operating as the at least one image output apparatus that performs the print processing on behalf of the execution apparatus according to a user operation on the operation screen, in which the proxy apparatus is managed by the server apparatus that manages the execution apparatus.

10. A print control method for a printing system including at least one image output apparatus, a server apparatus that manages each of the at least one image output apparatus as a print job transmission destination, and an information processing apparatus that inputs a print job to the server apparatus and instructs the at least one image output apparatus to receive the print job from the server apparatus and to perform print processing based on the received print job, the print control method comprising:
inputting the print job to the server apparatus;
selecting an execution apparatus that operates as an image output apparatus that performs print processing and a proxy apparatus that operates as an image output apparatus that performs print processing on behalf of the execution apparatus, in which the proxy apparatus is managed by the server apparatus that manages the execution apparatus;
delivering a multicast message relating to print instruction information, which is information instructing execution of the print processing and includes information relating to at least the selected execution apparatus and the proxy apparatus;
receiving the print instruction information;
determining whether the at least one image output apparatus is the execution apparatus or the proxy apparatus based on information relating to the execution apparatus and the proxy apparatus included in the received print instruction information;
acquiring, if it is determined that the at least one image output apparatus is the execution apparatus, state information of the proxy apparatus based on information relating to the proxy apparatus included in the print instruction information;
determining, based on state information of the at least one image output apparatus and the acquired state information of the proxy apparatus, whether the at least one image output apparatus operates as the execution apparatus that performs print processing instructed by the print instruction information or requests the proxy apparatus to perform proxy print processing;
delivering, if it is determined that the at least one image output apparatus requests the proxy apparatus to perform proxy print processing, a multicast message requesting the proxy apparatus to perform proxy print processing;
acquiring, if it is determined that the at least one image output apparatus operates as the execution apparatus that performs print processing, a print job that corresponds to the print processing from the server apparatus and executing the acquired print job if it is determined that the at least one image output apparatus operates as the execution apparatus that performs print processing;
monitoring and receiving, if it is determined that the at least one image output apparatus is the proxy apparatus, the multicast message; and
acquiring, if it is determined that the received message requests the proxy apparatus to perform proxy print processing, the print job that corresponds to the print processing from the server apparatus and executing the acquired print job.

* * * * *